US007546128B2

(12) United States Patent
Smith et al.

(10) Patent No.: US 7,546,128 B2

(45) **Date of Patent: *Jun. 9, 2009**

(54) SYSTEM AND METHOD FOR CHARACTERIZING TRAFFIC CONDITIONS BY ANALYZING OPERATIONAL DATA OF A WIRELESS NETWORK

(75) Inventors: Cyrus W. Smith, Marietta, GA (US); Clayton Wilkinson, IV, Alpharetta, GA (US); Kirk Carlson, Algonquin, IL (US); Michael P. Wright, Arlington, VA (US); Rahul Sangal, Pembroke Pines, FL (US)

(73) Assignee: AirSage, Inc., Marietta, GA (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/003,886

(22) Filed: Dec. 3, 2004

(65) Prior Publication Data

US 2005/0079878 A1 Apr. 14, 2005

Related U.S. Application Data

(63) Continuation of application No. 10/243,589, filed on Sep. 13, 2002, now Pat. No. 6,842,620.

(60) Provisional application No. 60/318,858, filed on Sep. 13, 2001.

(51) Int. Cl.

| | |
|---|---|
| ***H04W 24/00*** | (2009.01) |
| ***H04W 36/00*** | (2009.01) |
| *G08C 19/16* | (2006.01) |
| *G08G 1/00* | (2006.01) |

(52) U.S. Cl. .................... 455/456.1; 455/436; 455/440; 340/870.01; 340/870.07; 701/117; 701/118

(58) Field of Classification Search ... 455/456.1–456.6, 455/456, 457, 426, 436, 440, 441, 446; 340/870.01, 340/870.07, 539, 988; 701/117–119, 208
See application file for complete search history.

(56) References Cited

U.S. PATENT DOCUMENTS 5,023,900 A 6/1991 Tayloe et al. .................. 379/32

(Continued)

FOREIGN PATENT DOCUMENTS

EP 0 763 807 A1 3/1997

(Continued)

OTHER PUBLICATIONS

Supplementary European Search Report, EP 02 74 0023, Jun. 30, 2006.

(Continued)

*Primary Examiner*—Eugene Yun
(74) *Attorney, Agent, or Firm*—King & Spalding

(57) ABSTRACT

Characterizing traffic conditions by analyzing operational data taken from a wireless communication network to generate traffic information. Location estimates can be made based on processing the operational data. This location can be combined with computerized street maps to measure the time it takes to get from one geographic area to another. By aggregating and analyzing anonymous data from thousands of devices, the present invention is able to determine real-time and historical travel times and velocities between cities, intersections and along specific routes.

3 Claims, 20 Drawing Sheets

Operating Environment

U.S. PATENT DOCUMENTS

| | | | | |
|---|---|---|---|---|
| 5,465,289 | A | 11/1995 | Kennedy, Jr. | 379/59 |
| 5,559,864 | A | 9/1996 | Kennedy, Jr. | 379/59 |
| 6,115,754 | A * | 9/2000 | Landgren | |
| 6,150,961 | A | 11/2000 | Alewine et al. | |
| 6,381,533 | B1 | 4/2002 | Crane et al. | 701/200 |
| 6,384,739 | B1 | 5/2002 | Roberts, Jr. | 340/905 |
| 6,385,539 | B1 | 5/2002 | Wilson et al. | 701/213 |
| 6,420,999 | B1 | 7/2002 | Vayanos | 342/357.03 |
| 6,490,519 | B1 | 12/2002 | Lapidot et al. | 701/117 |
| 6,587,781 | B2 | 7/2003 | Feldman et al. | |
| 6,650,948 | B1 | 11/2003 | Atkinson et al. | |

FOREIGN PATENT DOCUMENTS

WO WO 01/23835 A2 4/2001

OTHER PUBLICATIONS

Texas Transportation Institute, Texas A&M University System, Office of Highway Information Management, Federal Highway Administration, U.S. Department of Transportation, "Travel Time Data Collection Handbook," Report No. FHWA-PL-98-035, Mar. 1998, pp. 1-341.

* cited by examiner

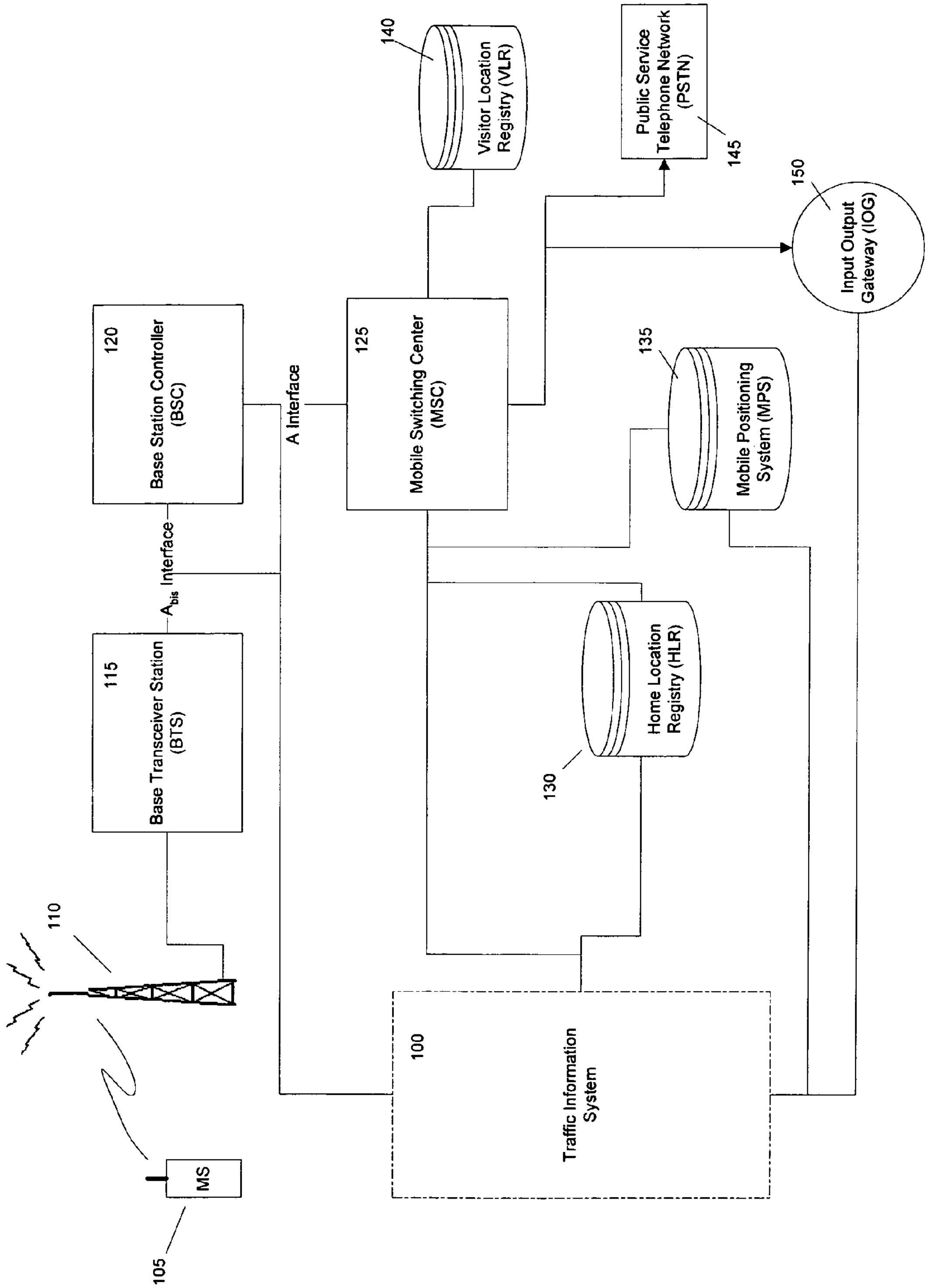
Figure 1: Operating Environment

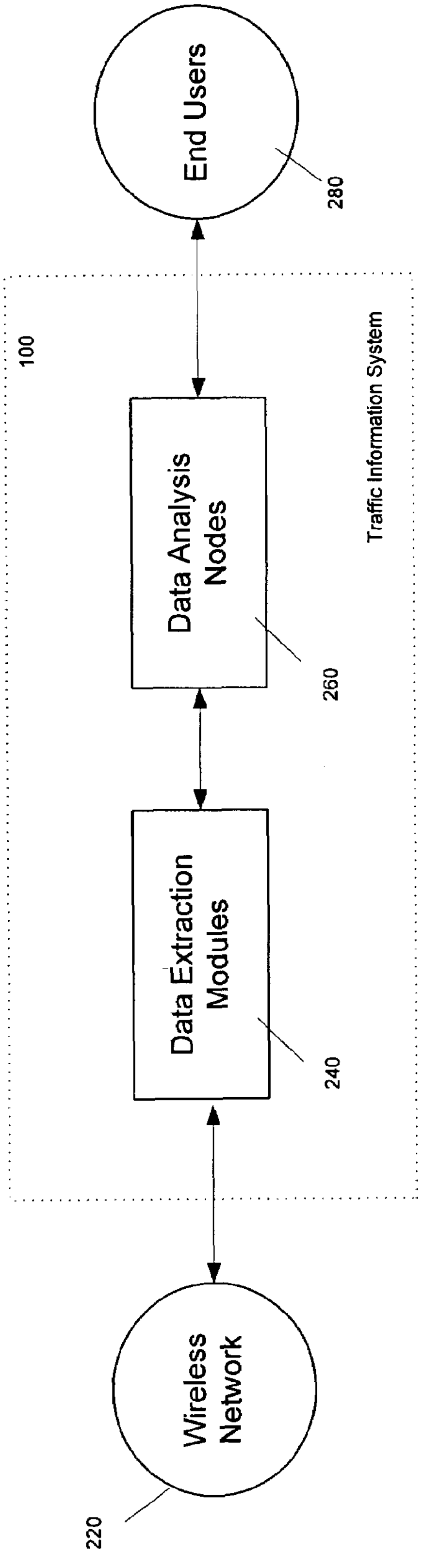
Figure 2a: Traffic Information System Block Diagram

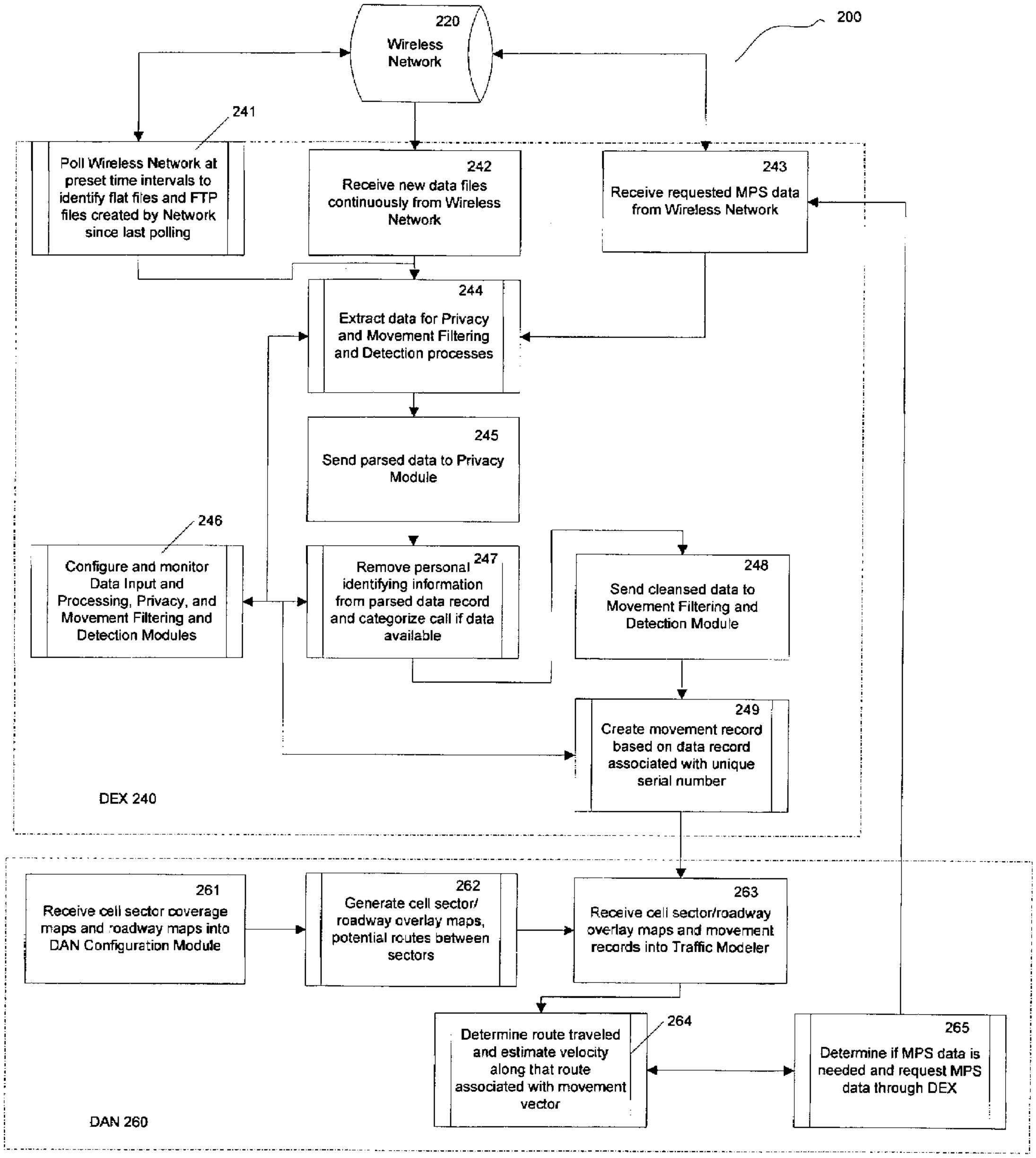
Figure 2b: Overall Process of a Traffic Information System

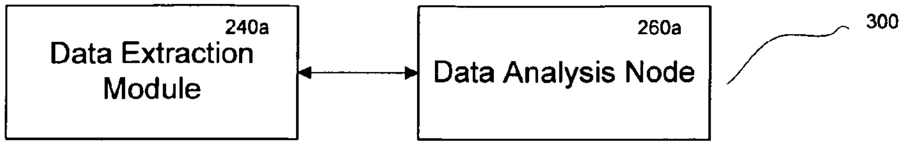
Figure 3a: Single Data Extraction Module Paired with Single Data Analysis Node
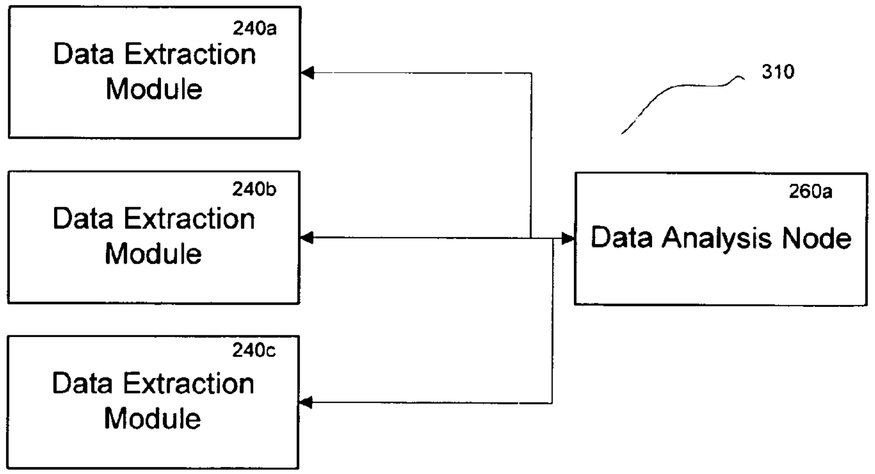
Figure 3b: Multiple Data Extraction Modules Linked with Single Data Analysis Node

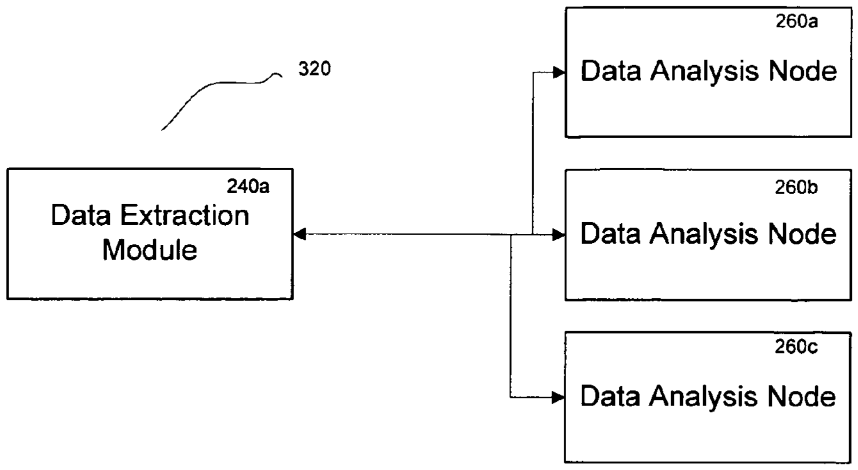
Figure 3c: Single Data Extraction Module Linked with Multiple Data Analysis Nodes
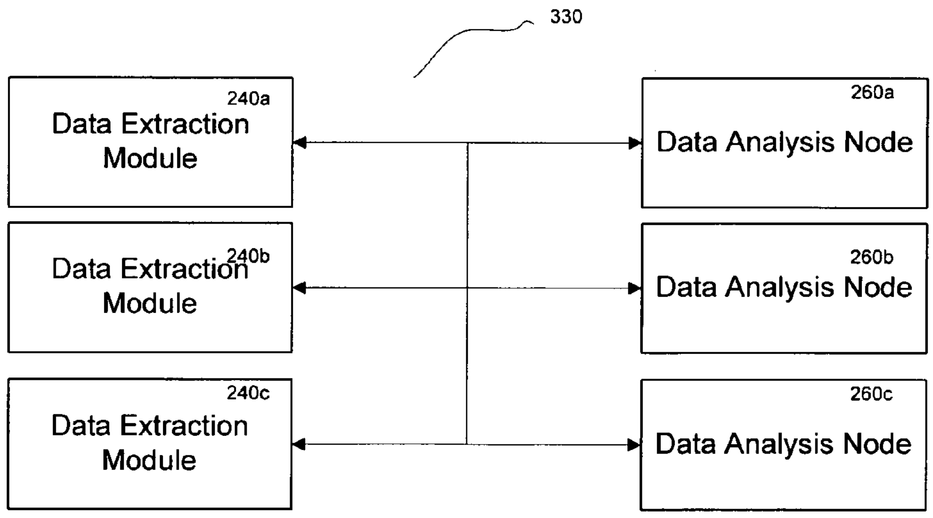
Figure 3d: Multiple Data Extraction Modules Linked with Multiple Data Analysis Nodes

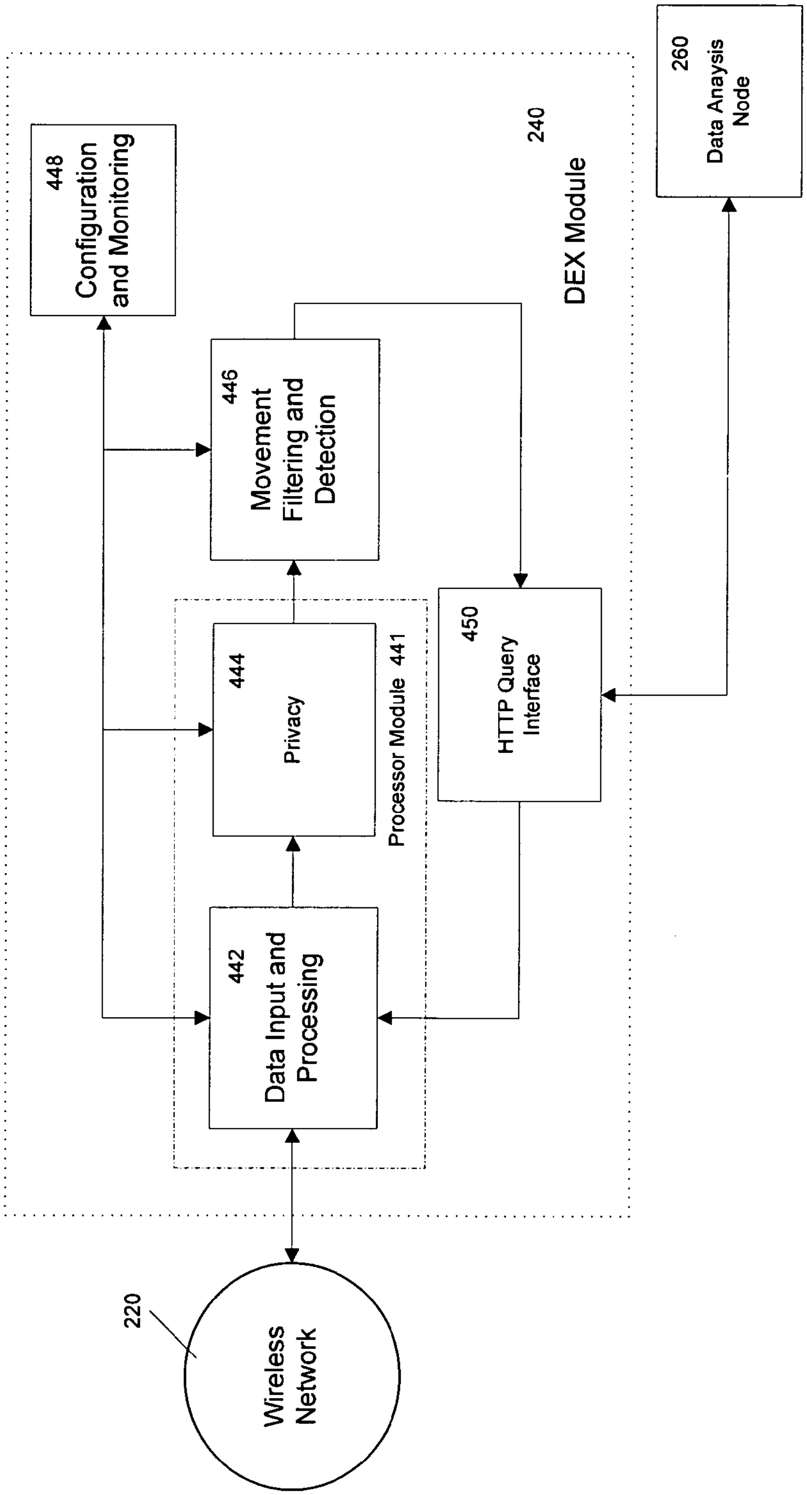
Figure 4: DEX Process-Level Block Diagram

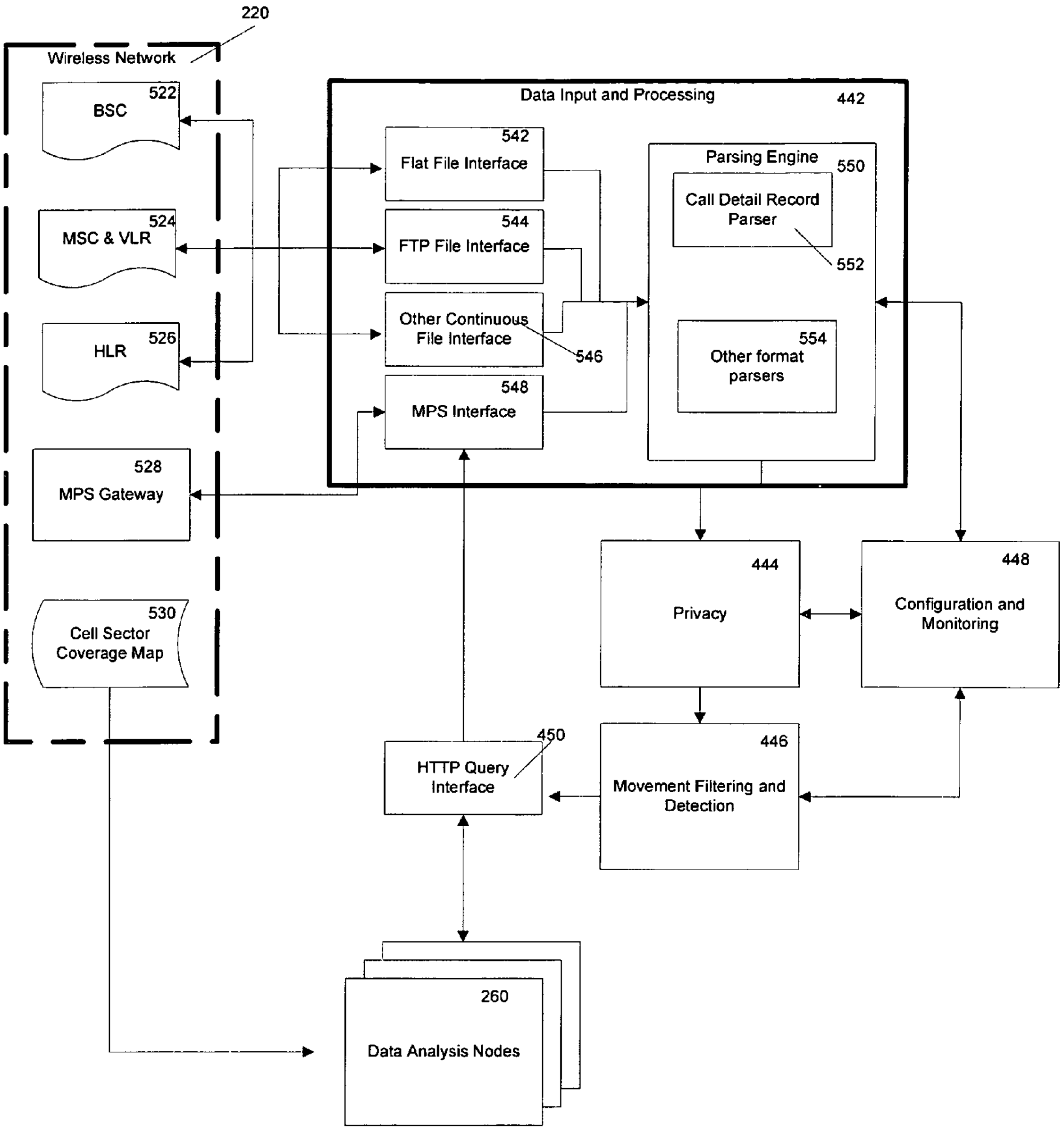
Figure 5: DEX Data Input and Processing

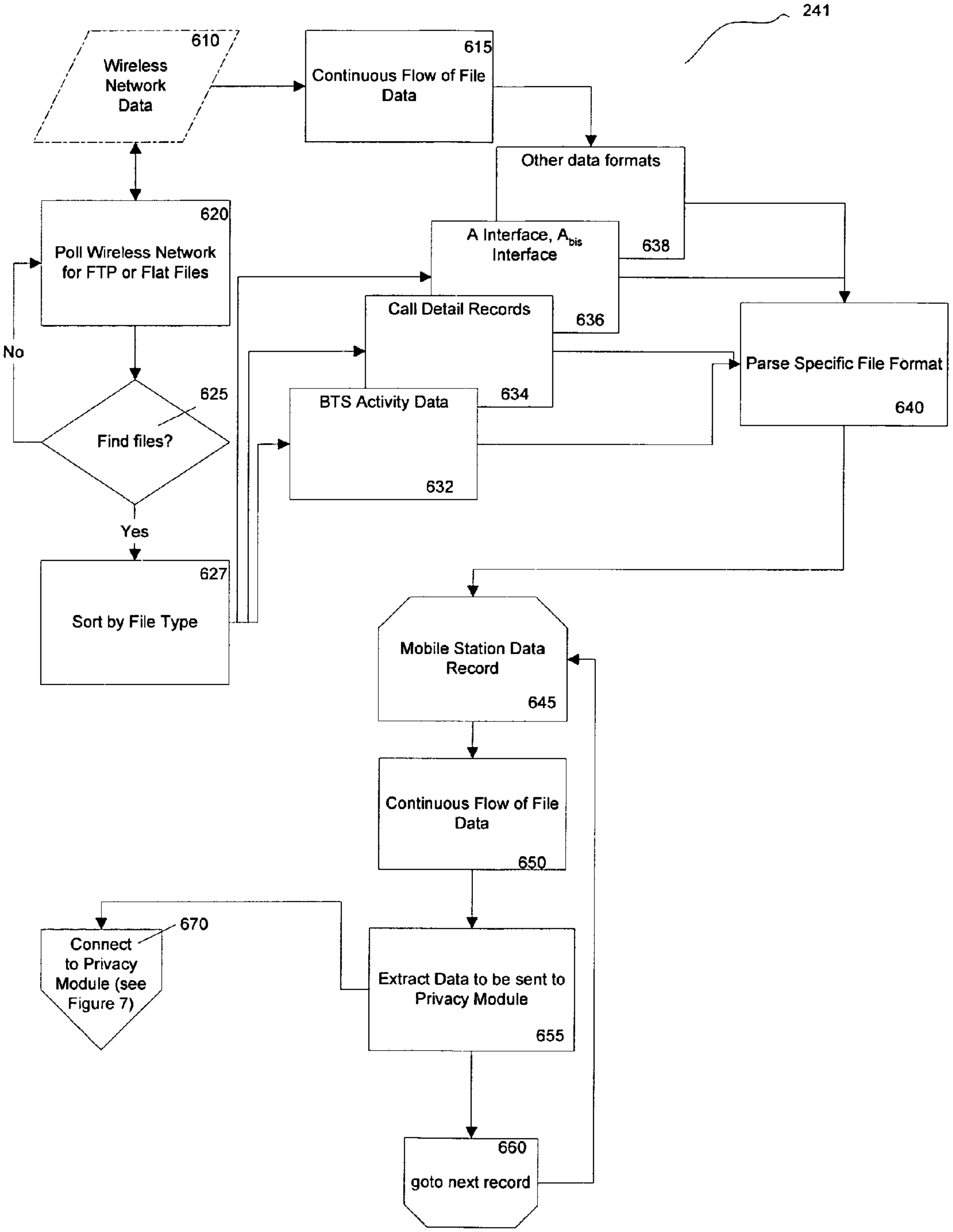
Figure 6: File Polling and Parsing Process

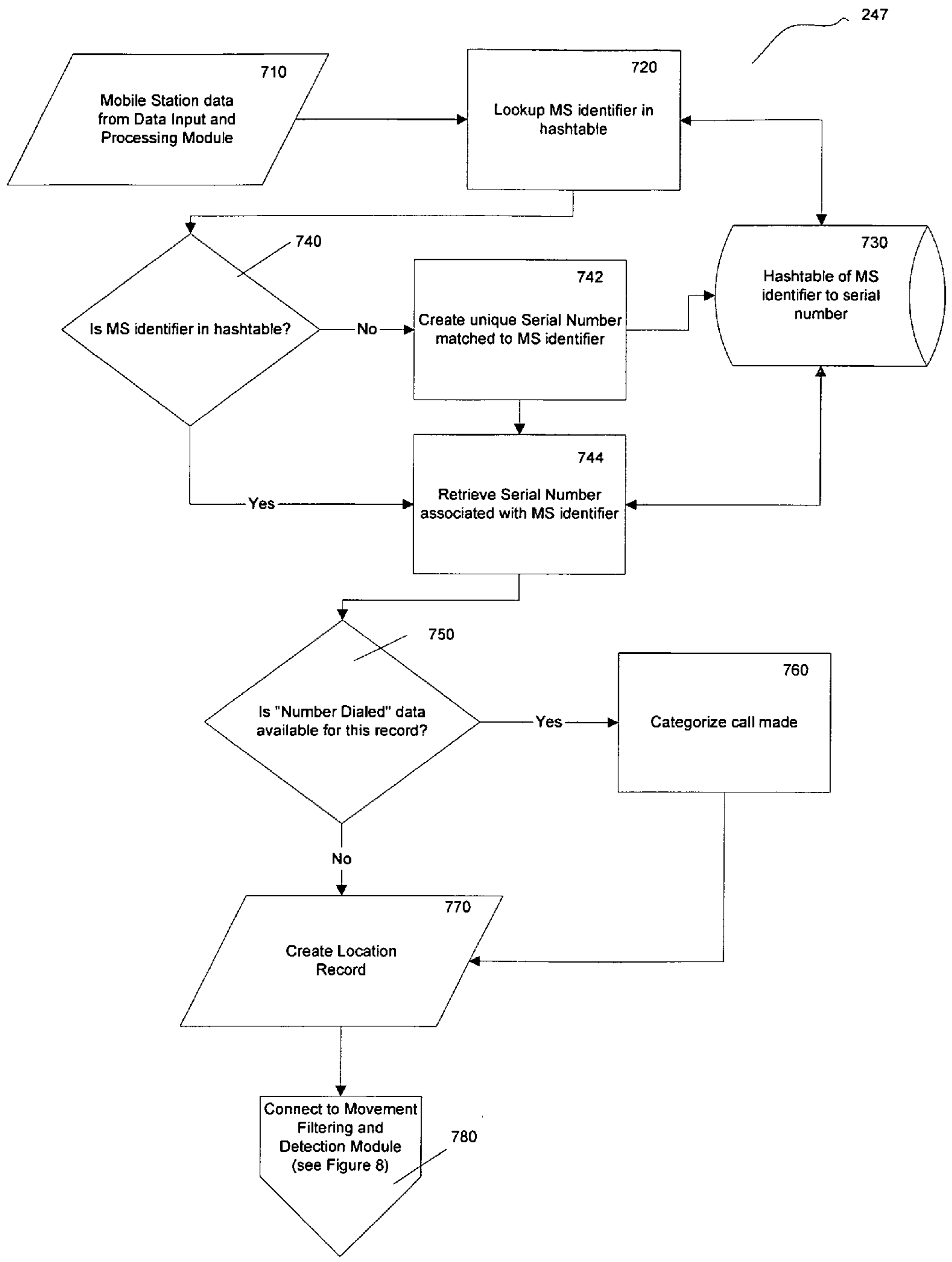
Figure 7: Privacy Module Process

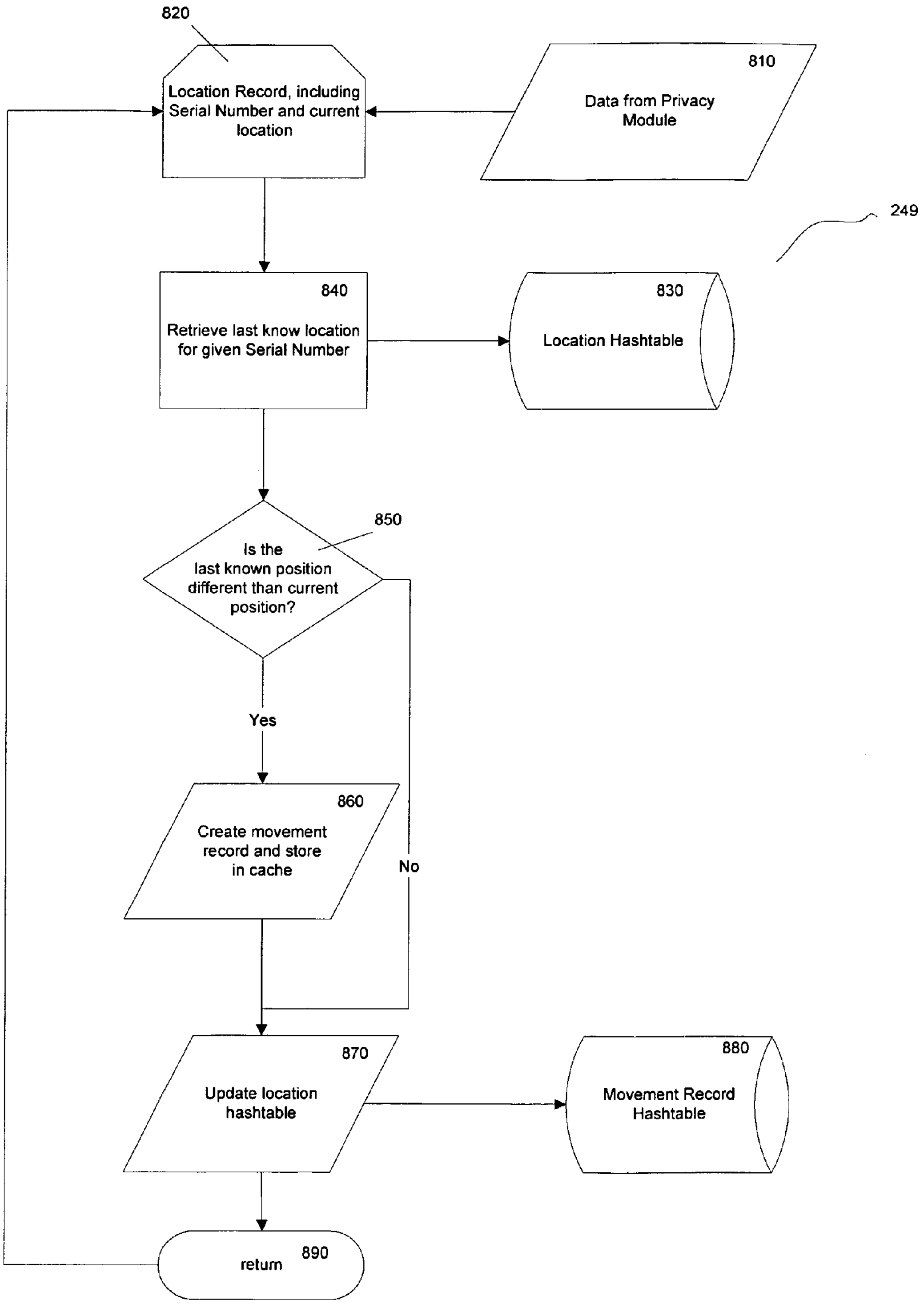
Figure 8: Movement Filtering and Detection

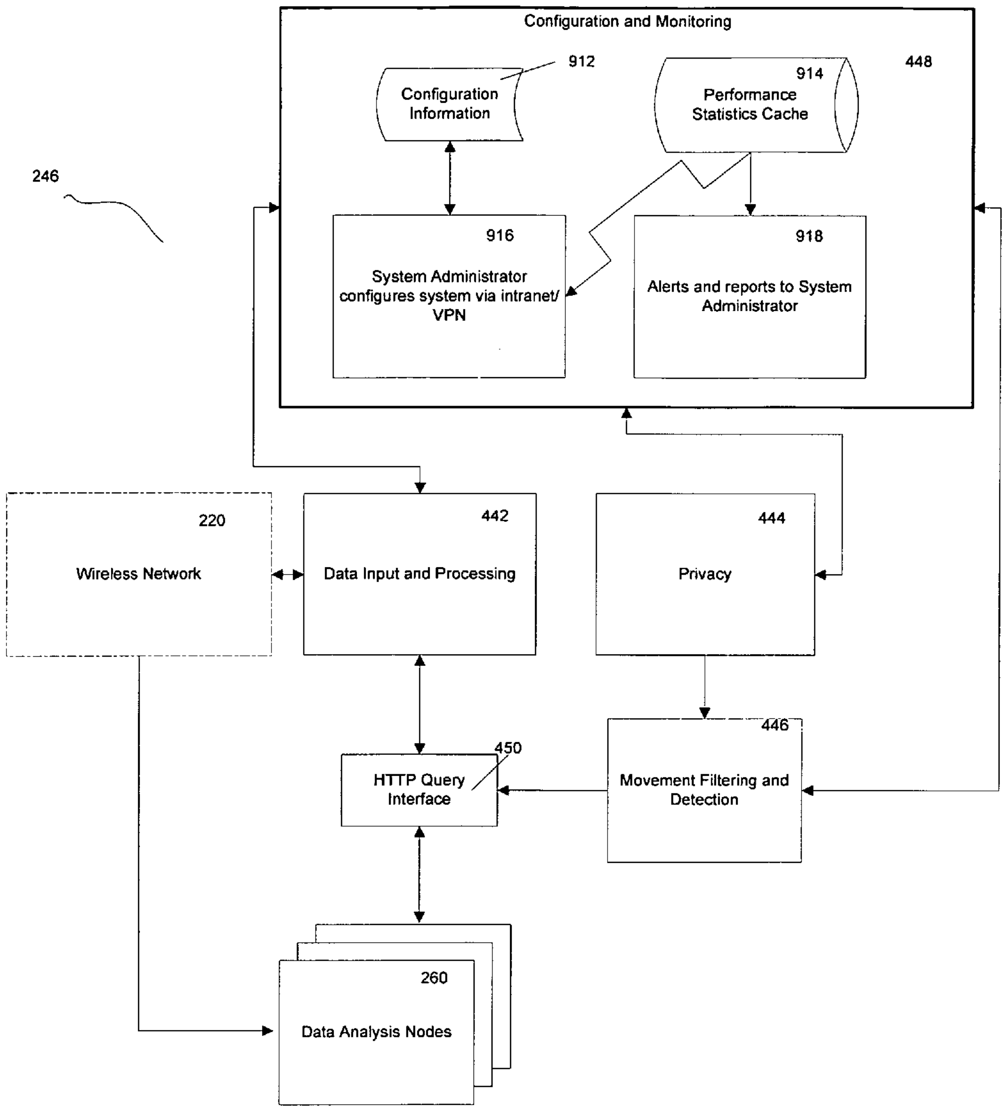
Figure 9: DEX Configuration and Monitoring

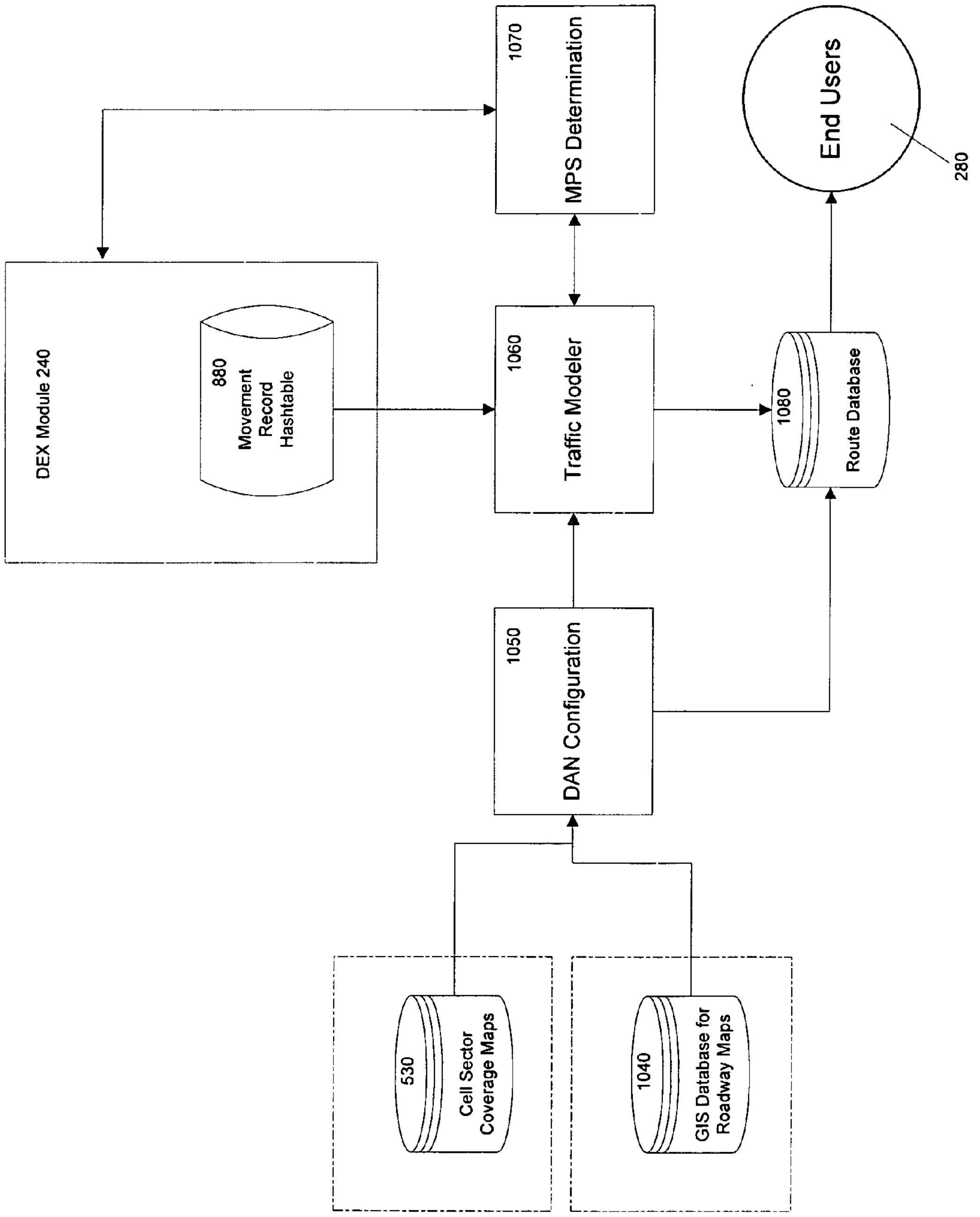
Figure 10: DAN Process-Level Block Diagram

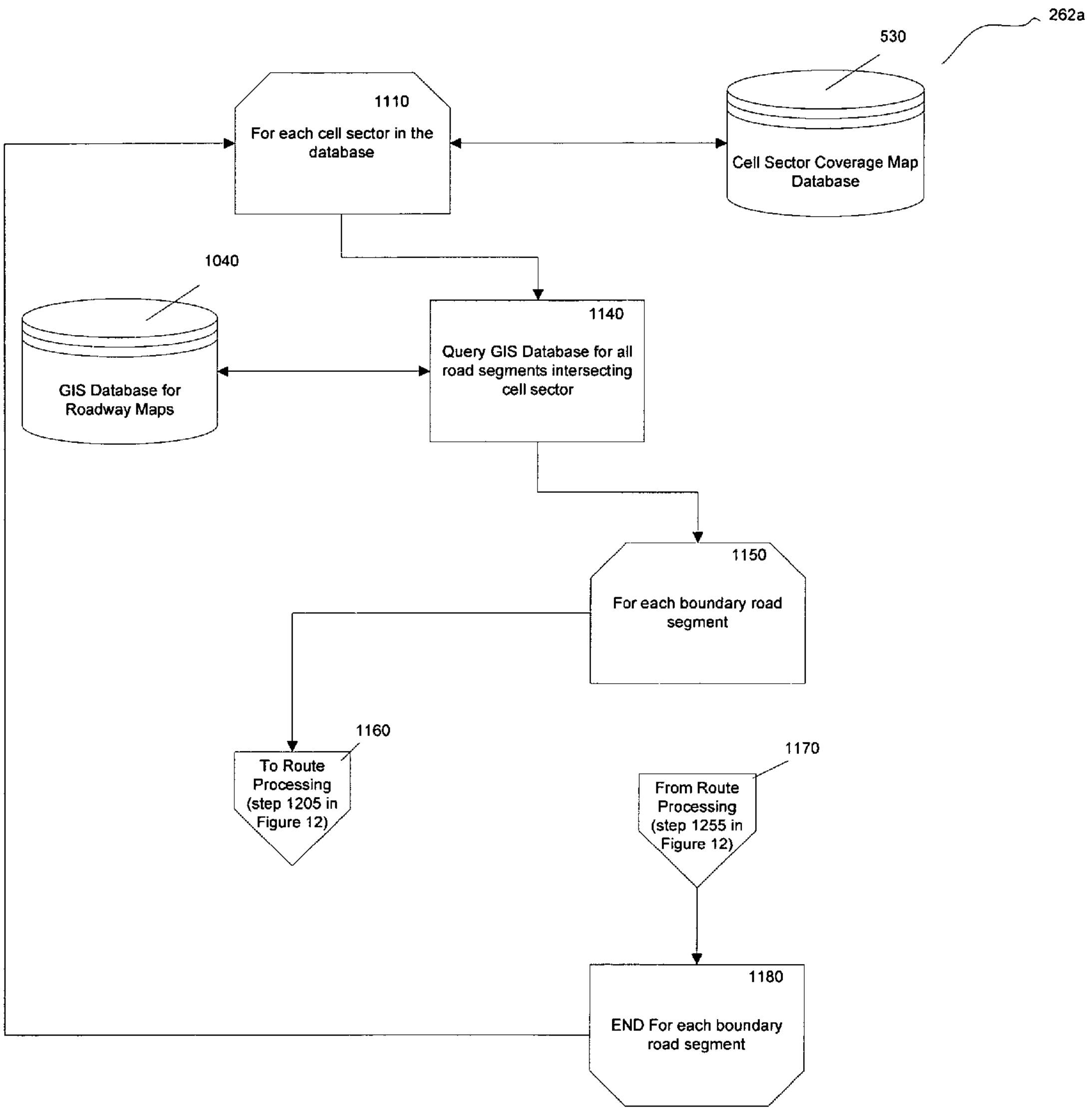
Figure 11: Route Generation

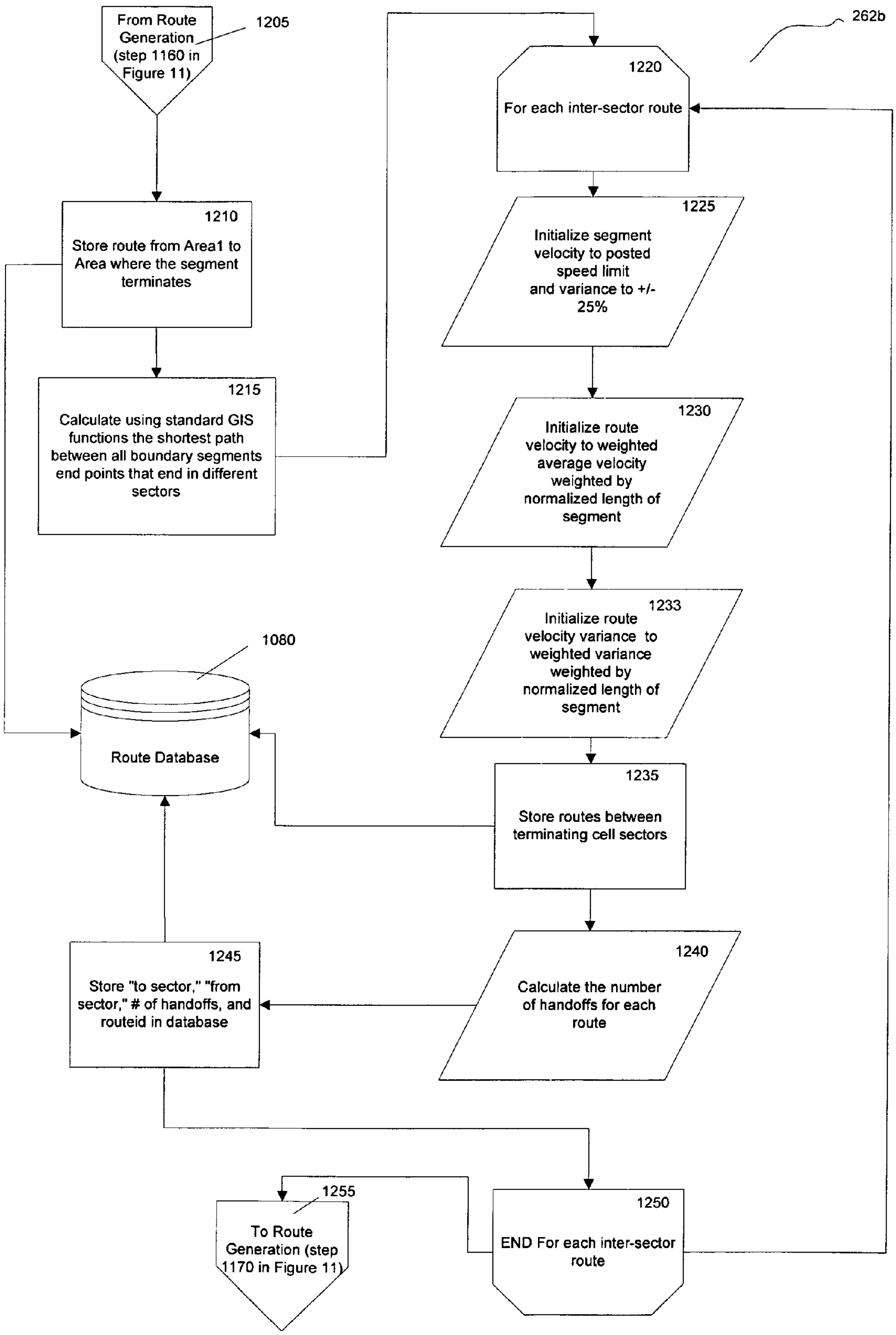
Figure 12: Route Processing

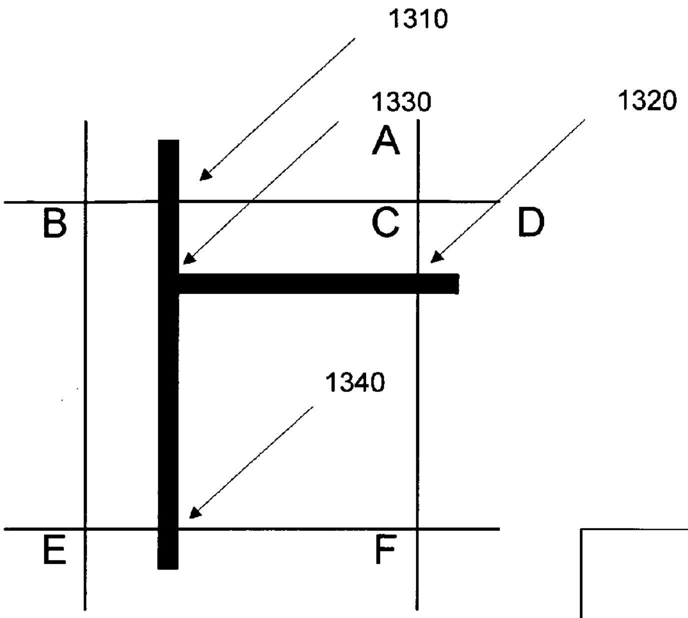
Figure 13b: Illustration of Cell Sector/Roadway overlay
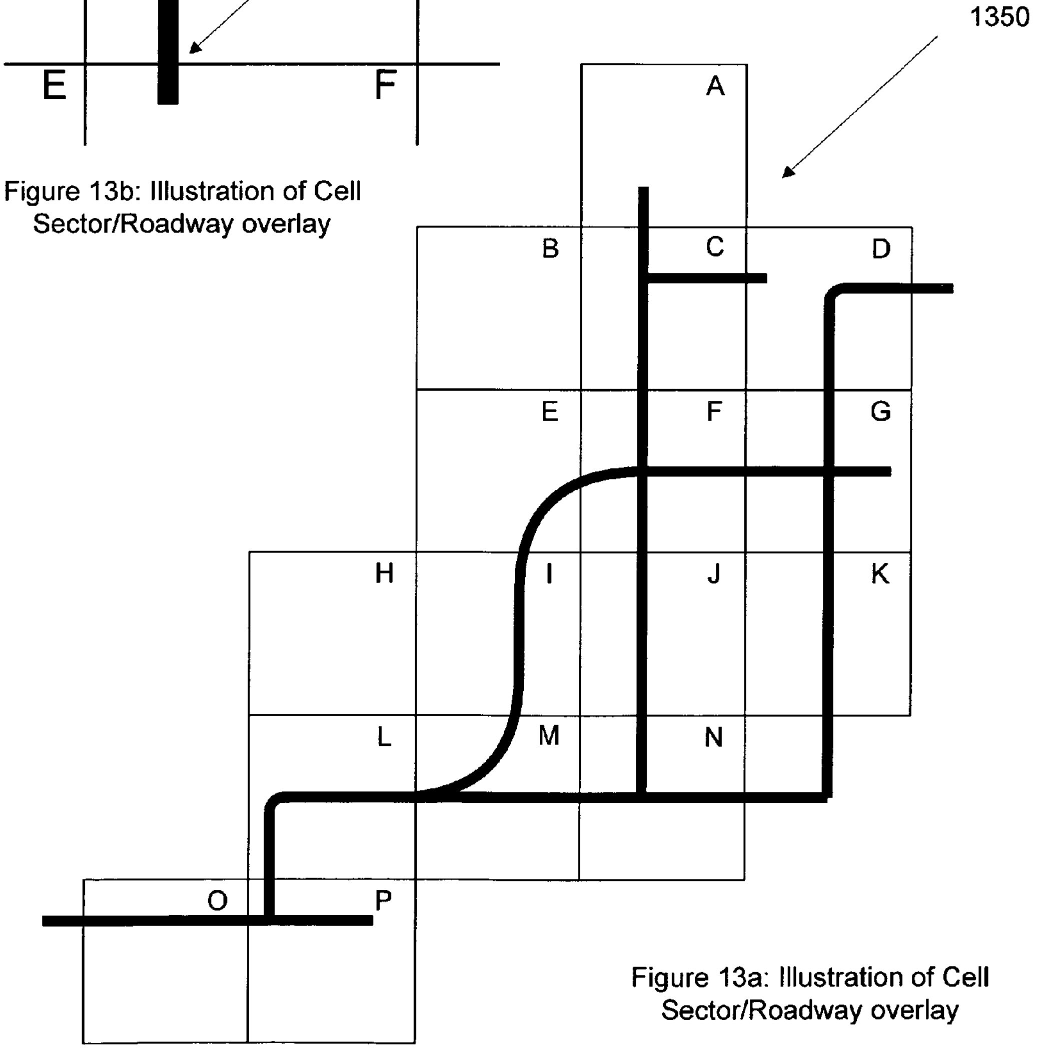
Figure 13a: Illustration of Cell Sector/Roadway overlay

Figure 14: Realistic Cell Sector/Roadway Overlay

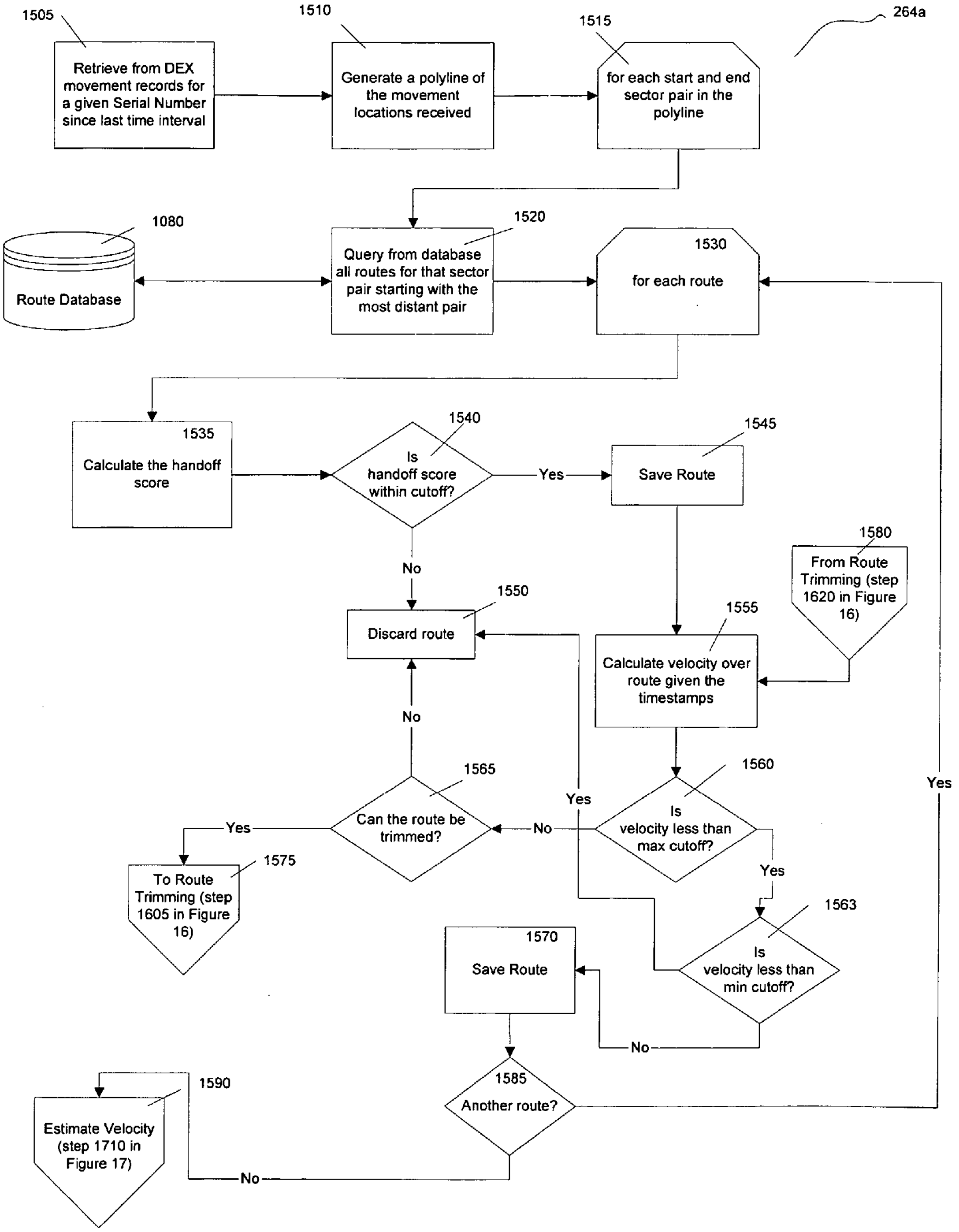
Figure 15: Route Selection

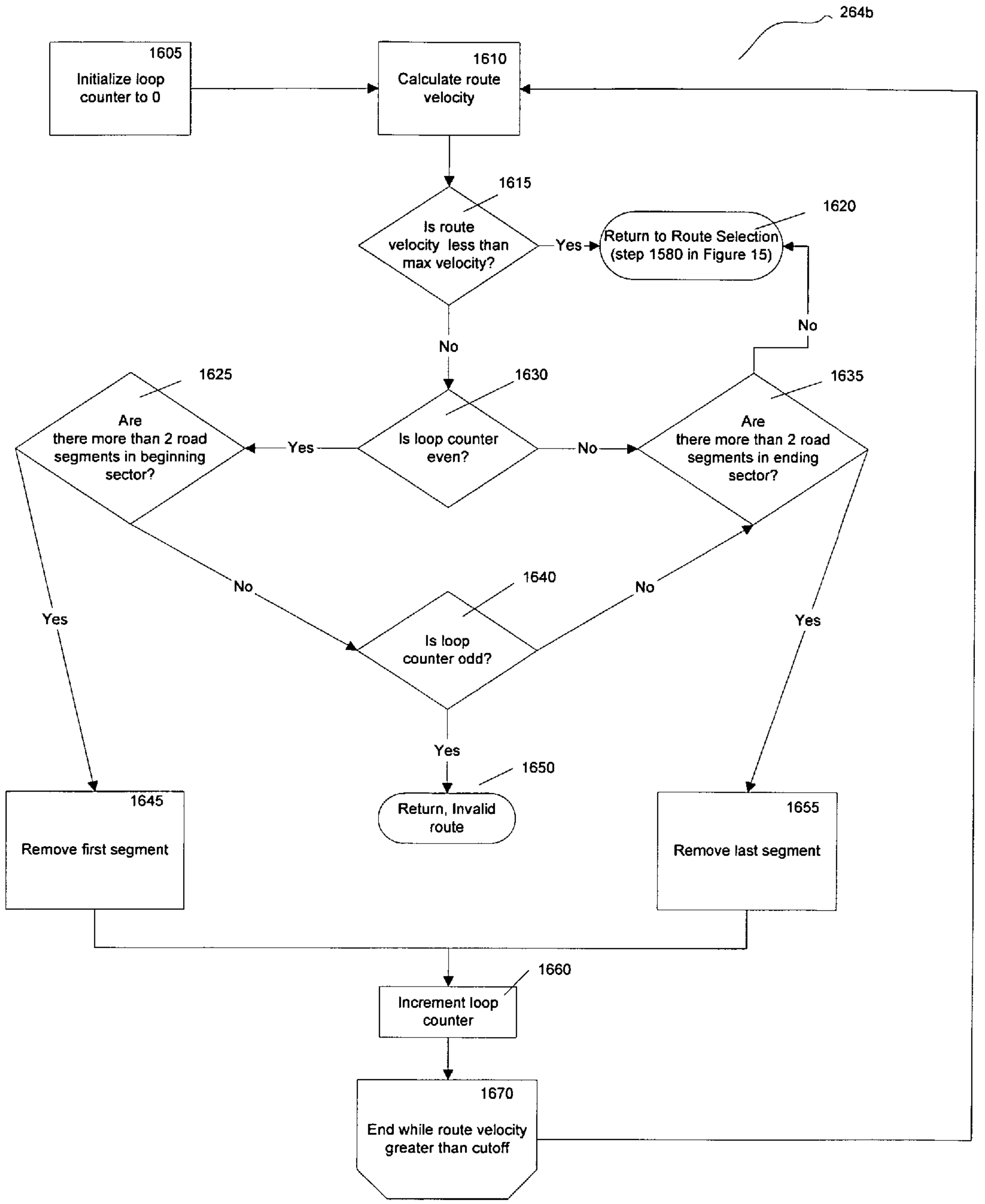
Figure 16: Route Trimming

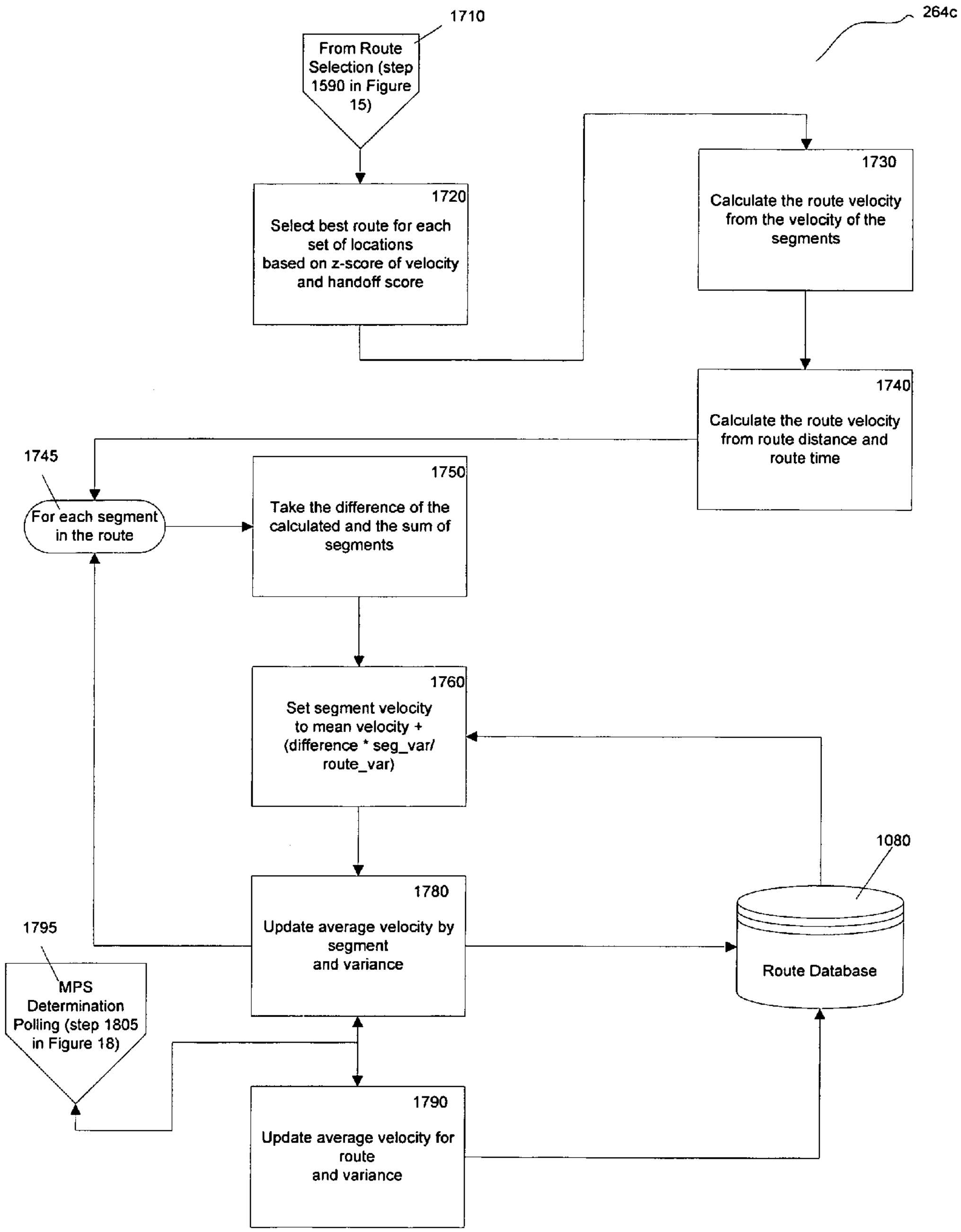
Figure 17: Velocity Estimation

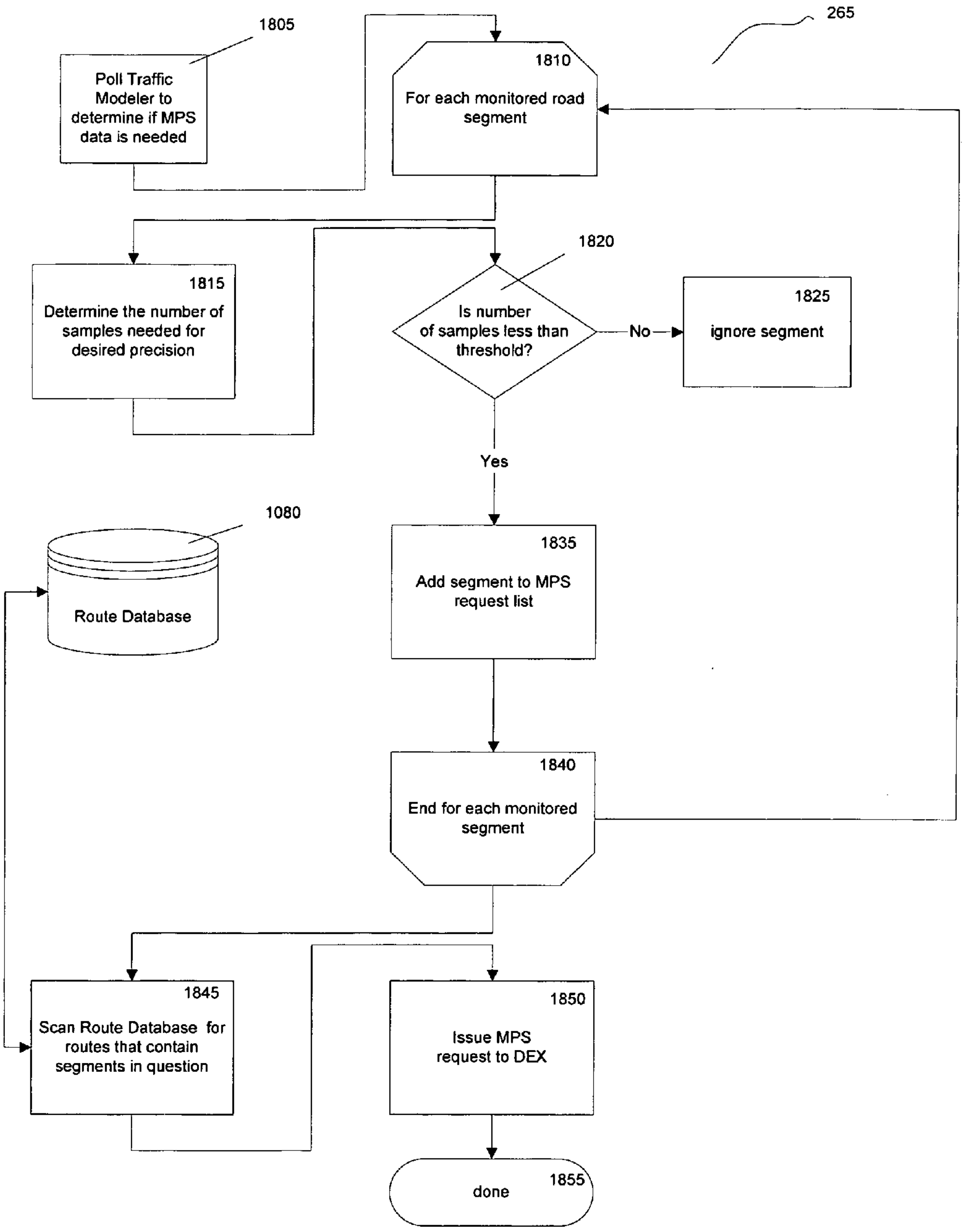
Figure 18: MPS Determination

SYSTEM AND METHOD FOR CHARACTERIZING TRAFFIC CONDITIONS BY ANALYZING OPERATIONAL DATA OF A WIRELESS NETWORK

STATEMENT OF RELATED PATENT APPLICATIONS

This application is a continuation of U.S. application Ser. No. 10/243,589 filed Sep. 13, 2002 now U.S. Pat. No. 6,842, 620, entitled System and Method for Providing Traffic Information Using Operational Data of a Wireless Network. This non-provisional patent application is hereby fully incorporated herein by reference. This continuation application claims priority under 35 U.S.C. § 119 to U.S. Provisional Patent Application No. 60/318,858, titled System and Method for Providing Traffic Information Using Operational Data at a Wireless Network, filed Sep. 13, 2001. This provisional application is hereby fully incorporated herein by reference.

FIELD OF THE INVENTION

This invention relates to a system and method for providing traffic information. More particularly, this invention relates to using operational data developed by a wireless telephony communication network to generate traffic information.

BACKGROUND OF THE INVENTION

Traffic congestion has reached crisis levels in most major cities throughout the U.S. and is becoming a major problem in smaller cities and rural areas as well. Not only is traffic congestion a source of frustration for commuters, this congestion is also costly and a significant contributor to air pollution. The Texas Transportation Institute's 2001 Urban Mobility Report estimates that the total congestion costs for 68 U.S. urban areas from New York City down to those cities with populations of 100,000 is $78 billion, which was the value of 4.5 billion hours of delay and 6.8 billion gallons of excess fuel consumed. From 1982 to 1999, the time that travelers wasted in traffic increased from 12 hours to 36 hours per year.

Research has shown that meaningful travel information can reduce commute times by 13% and demand for traffic data is growing exponentially. A recent Gallup study showed that nearly 30% of all commuters and through travelers are willing to pay $1 to $5 per use and nearly 50% of commercial vehicle operators are willing to pay $10 per month; however, the data is simply not available.

Currently, transportation agencies collect highway traffic data from radar devices, video cameras, roadside sensors, and other hardware requiring expensive field installation and maintenance. Transportation agencies currently spend more than $1 billion per year for traffic monitoring systems covering less than 10% of our national highway system. Data is delivered to a Traffic Management Center (TMC) via high-speed fiber-optic communications where it is organized, analyzed, and then delivered to the public by overhead or roadside message boards, Department of Transportation Web sites, and through partnerships with radio, television, and other media outlets. This hardware-oriented field equipment approach to collecting traffic data and providing information is costly and is practical in select urban areas only.

An emerging concept is the idea of using a Global Positioning System (GPS) device to determine a series of positions of mobile communication devises and transmit these data via a wireless network to a central computer processor. The processor can then calculate the speed and direction of the device for use in determining traffic flow. While this approach can give very accurate information for a small number of devices, any attempt to gather positioning information from a large number of devices will use up large amounts of scarce bandwidth from the wireless network and prove to be very costly. Additionally, GPS data is not available for most of the wireless networks operating today. Although some nationwide trucking companies have GPS location devices in their trucks, these vehicles represent a small fraction of the number of vehicles using the roadways.

While most wireless telephony networks do not have GPS data capabilities, they do have a vast infrastructure of communication facilities. These facilities generate data routinely to enable the system to properly function, e.g., to enable cellular phone users to place and receive calls and stay connected to these calls as they move though the cell sectors of a system. Examples of these data include call detail records (CDR), handover messages, and registration messages.

In September of 1999, the FCC ordered wireless carriers to begin selling and activating phones that could be located to within 100 meters in the event of a 911 call. This requirement is referred to as Enhanced or Phase II 911. Phase II 911 is not expected to be fully implemented until 2005. This system uses GPS or signal characteristics to locate the cellular phone. Regardless of the process used, limited network capacity makes it impractical to monitor traffic using this capability as the primary source of location data.

In view of the foregoing, there is a need for a traffic information system that is capable of using data types generated routinely by wireless telephony communication networks that can be extracted from the wireless network's infrastructure without adversely affecting the performance of the wireless system or taxing the networks' resources.

SUMMARY OF THE INVENTION

The present invention overcomes the deficiencies of other systems and methods for providing traffic information by using operational data extracted from wireless telephony communication network infrastructure without adversely impacting network resources.

One aspect of the present invention provides a system for extracting movement information using operational data for mobile stations operating in a wireless telephony communication network. A processor module, logically coupled to the wireless telephony communication network, generates traffic data records based on the operational data obtained from the wireless telephony communication network. A movement filtering and detection module, logically coupled to the processor module, generates a movement record in response to processing at least two traffic data records associated with a wireless communication activity by a mobile station.

Another aspect of the present invention provides a system for determining traffic velocities along traffic routes by using operational data associated with mobile stations operating in a wireless telephony communications network. An analysis configuration module, logically coupled to at least one database that contains cell sector coverage area information for the wireless telephony communications network and geographic information for roadways within the cell sector coverage area of the wireless telephony communications network, generates traffic routes between any two of the cell sectors by processing the cell sector coverage area information and the geographic information for roadways. A traffic modeler module, logically coupled to the analysis configuration module, generates a plurality of data records by processing movement records for the mobile stations within a context provided by the plurality of traffic routes. Each movement record comprises at least two locations within the wireless telephony communication network for the same mobile station at different times and reflects movement within the cell sector coverage area by the same mobile station.

Yet another inventive aspect provides a system for determining traffic velocities along traffic routes by using operational data associated with mobile stations operating in a wireless telephony communications network overlapping the traffic routes. A processor module, logically coupled to the wireless telephony communication network, generates a plurality of traffic data records based on operational data obtained from the wireless telephony communication network. Each traffic data record identifies a location within the wireless telephony communication network for one of the mobile stations at a particular time. The processor module determines the location without the aid of a mobile positioning system. A movement filtering and detection module, logically coupled to the processor module, generates a movement record in response to processing at least two traffic data records associated with a wireless communication activity by a same one of the mobile stations. Each movement record comprises at least two locations within the wireless telephony communication network for the same mobile station at different times and reflects movement by the same mobile station. An analysis configuration module, logically coupled to at least one database comprising cell sector coverage area information for the wireless telephony communications network and geographic information for roadways within the cell sector coverage area of the wireless telephony communications network, generates traffic routes between any two of the cell sectors by processing the cell sector coverage area information and the geographic information for roadways. A traffic modeler module, logically coupled to the movement filtering and detection module and to the analysis configuration module, generates data records by processing the locations for the mobile stations as identified by the movement records within a geographical context provided by the plurality of traffic routes. Each data record comprises an identification of the velocity along a particular one of the traffic routes.

One inventive aspect of the present invention provides a method for extracting movement information using operational data for mobile stations operating in a wireless telephony communication network. The method includes generating traffic data records based on the operational data from the wireless telephony communication network. Each traffic data record identifies a location within the cell sector coverage area of the wireless telephony communication network for one of the mobile stations at a particular time. The method also includes generating a movement record in response to processing two or more of the traffic data records associated with a wireless communication activity by a same one of the mobile stations. Each movement record comprises at least two locations within the wireless telephony communication network for the same mobile station at different times and reflects movement by the same mobile station. The method also includes identifying a route traveled by a vehicle associated with the movement record from possible routes between the at least two locations.

Another inventive aspect provides a method for determining traffic velocities along traffic routes based on movement of mobile stations operating within a wireless telephony communications network comprising a cell sector coverage area overlapping with the traffic routes and having a plurality of cell sectors. The method creates traffic routes between any two of the cell sectors by processing cell sector coverage area information for the wireless telephony communications network and geographic information for roadways within the cell sector coverage area of the wireless telephony communications network. The method also identifies a particular one of the traffic routes traveled by a vehicle associated with one of the mobile stations by processing movement records for the mobile station within a geographical context defined by the plurality of traffic routes. Each movement record comprises at least two locations within the wireless telephony communication network for a same one of the mobile stations at different times and reflects movement of the same mobile station. The method calculates an estimate of a velocity of the vehicle associated with the mobile station along the particular traffic route.

Yet another inventive aspect provides a method for determining traffic velocities along traffic routes by using operational data associated with mobile stations operating in a wireless telephony communications network overlapping the traffic routes and comprising a cell sector coverage area having a plurality of cell sectors. The method generates traffic data records based on the operational data from the wireless telephony communication network. Each traffic data record identifies a location within the wireless telephony communication network for one of the mobile stations at a particular time. The method generates a movement record in response to processing at least two of the traffic data records associated with a wireless communication activity by a same one of the mobile stations. Each movement record comprises at least two locations within the wireless telephony communication network for the same mobile station at different times and reflects movement by the same mobile station. The method creates traffic routes between any two of the cell sectors by processing cell sector coverage area information for the wireless telephony communications network and geographic information for roadways within the cell sector coverage area of the wireless telephony communications network and identifies from the traffic routes a particular one of the traffic routes traveled by a vehicle associated with one of the mobile stations by processing movement records for the mobile station. The method calculates an estimate of a velocity of vehicular traffic along the particular traffic route by using the movement records associated with the particular traffic route.

Yet another aspect of the present invention provides a system for extracting movement information using operational data for mobile stations operating in a wireless telephony communication network. A privacy module, logically coupled to the wireless telephony communications network modifies a mobile station identifier number identifying one of the mobile stations within the operational data. The modification conceals the identity of the mobile station.

The aspects of the present invention may be more clearly understood and appreciated from a review of the following detailed description of the disclosed embodiments and by reference to the drawings and claims.

BRIEF DESCRIPTION OF THE DRAWINGS

FIG. 1 depicts the operating environment of an exemplary embodiment of the present invention.

FIG. 2*a* presents a block diagram showing the main components of an exemplary embodiment of the present invention.

FIG. 2*b* presents an overall process flow diagram of an exemplary embodiment of the present invention.

FIG. 3*a* shows the relationship between a Data Extraction Module and a Data Analysis Node in an exemplary embodiment of the present invention.

FIG. 3*b* shows the relationship between Data Extraction Modules and a Data Analysis Node in an alternative embodiment of the present invention.

FIG. 3*c* shows the relationship between a Data Extraction Module and Data Analysis Nodes in an alternative embodiment of the present invention.

FIG. 3*d* shows the relationship between Data Extraction Modules and Data Analysis Nodes in an alternative embodiment of the present invention.

FIG. 4 depicts a process-level block diagram of the Data Extraction Module of an exemplary embodiment of the present invention.

FIG. 5 presents a block diagram of the Data Extraction Module of an exemplary embodiment of the present invention, focusing on a Data Input and Processing function.

FIG. 6 presents a process flow diagram for a File Polling and Parsing Process of an exemplary embodiment of the present invention.

FIG. 7 presents a process flow diagram for a Privacy Process of an exemplary embodiment of the present invention.

FIG. 8 presents a process flow diagram for a Movement Filtering and Detection Process of an exemplary embodiment of the present invention.

FIG. 9 presents a block diagram of a Data Extraction Module of an exemplary embodiment of the present invention, focusing on the Configuration and Monitoring function.

FIG. 10 depicts a process-level block diagram of a Data Analysis Node of an exemplary embodiment of the present invention.

FIG. 11 presents a process flow diagram for a Route Generation Process of an exemplary embodiment of the present invention.

FIG. 12 presents a process flow diagram for a Route Processing Process of an exemplary embodiment of the present invention.

FIG. 13*a* presents an illustrative example of a cell sector/roadway overlay.

FIG. 13*b* presents an enhanced view of an illustrative example of a cell sector/roadway overlay.

FIG. 14 presents an actual example of a cell sector/roadway overlay.

FIG. 15 presents a process flow diagram for a Route Selection Process of an exemplary embodiment of the present invention.

FIG. 16 presents a process flow diagram for a Route Trimming Process of an exemplary embodiment of the present invention.

FIG. 17 presents a process flow diagram for a Velocity Estimation Process of an exemplary embodiment of the present invention.

FIG. 18 presents a process flow diagram for a Mobile Positioning System Determination Process of an exemplary embodiment of the present invention.

DETAILED DESCRIPTION OF THE EXEMPLARY EMBODIMENTS

Exemplary embodiments of the present invention provide a system and method for using operational data from existing wireless telephony communications networks to estimate traffic movement throughout a traffic system. FIG. 1 presents the wireless telephony communications network operating environment for an exemplary embodiment of the present invention, the Traffic Information System 100. Mobile station (MS) 105 transmits signals to and receives signals from the radiofrequency transmission tower 110 while within a geographic cell covered by the tower. These cells vary in size based on anticipated signal volume. A Base Transceiver System (BTS) 115 is used to provide service to mobile subscribers within its cell. Several Base Transceiver Systems are combined and controlled by a Base Station Controller (BSC) 120 through a connection called the $A_{bis}$ Interface. The Traffic Information System 100 can interface with the $A_{bis}$ Interface line. A Mobile Switching Center (MSC) 125 does the complex task of coordinating all the Base Station Controllers, through the A Interface connection, keeping track of all active mobile subscribers using the Visitor Location Register (VLR) 140, maintaining the home subscriber records using the Home Location Register (HLR) 130, and connecting the mobile subscribers to the Public Service Telephone Network (PSTN) 145.

In an Enhanced or Phase II 911 system, the location of a mobile station 105 can be determined by embedding a GPS chip in the mobile station 105, or by measuring certain signaling characteristics between the mobile station 105 and the BTS 115. In either scenario, the process of locating a mobile station 105 with the degree of accuracy needed for the Enhanced or Phase II 911 system is managed with a Mobile Positioning System (MPS) 135. The MPS 135 uses the same network resources that are used to manage and process calls, which makes its availability somewhat limited.

The Input Output Gateway (IOG) 150 processes call detail records (CDRs) to facilitate such actions as mobile subscriber billing. The IOG 150 receives call-related data from the MSC 125 and can interface with the Traffic Information System 100.

In the exemplary embodiment of the present invention shown in FIG. 1, the Traffic Information System 100 may receive data from a variety of locations in the wireless network. These locations include the BSC 120 and its interface, through the $A_{bis}$ Interface, with the BTS 115, MSC 125, the HLR 130, and the MPS 135.

The input communications processes monitor the wireless service provider's network elements and extract the relevant information from selected fields of selected records. The Traffic Information System 100 can use data from any network element that contains at a minimum the mobile station identifier number, cell ID and a time stamp. Some of the more common data sources are discussed below.

CDRs may be requested from billing distribution centers or the distribution centers may autonomously send the records via file transfer protocol (FTP). Alternatively the CDRs may be extracted as they are routinely passed from the IOG 150 to a billing gateway, possibly utilizing a router that duplicates the packets. The specific method used will depend on the equipment and preferences of the wireless service provider.

Handover and Registration messages may be obtained by monitoring the proprietary or standard A-interface signaling between the MSC 125 and the BSCs 120 that it controls. The Traffic Information System 100 may monitor that signaling directly or it may obtain signaling information from a signal monitoring system such as a protocol analyzer. In the latter case the signaling information may already be filtered to remove extraneous information (see FIG. 7 for a discussion of the Privacy process for the exemplary embodiment of the present invention). Alternatively, these messages may be extracted from a Base Station Manager that continuously monitors message streams on the BTS 115.

Turning to FIG. 2*a*, in an exemplary embodiment, an existing wireless telephony communications network 220, otherwise referred to as a Wireless Network, exchanges information with Data Extraction Modules 240 of the Traffic Information System 100. The Data Extraction (DEX) Modules 240 exchange information with Data Analysis Nodes (DAN) 260, which in turn exchanges information to end users 280 of the traffic information. In an alternative embodiment of the present invention, the DEX Modules could exchange information directly with End Users 280. In still another alternative embodiment of the present invention, a process other than DEX Module 240 may supply movement vectors to the DAN Module 260 for analysis for an end user 280. The end users 280 may include the departments of transportation, media outlets, private transportation companies, or information service providers. Details on the types of information exchanged between the modules are discussed below.

FIG. 2*b* presents an overview of the traffic information system process 200 for an exemplary embodiment of the present invention. The DEX Module 240 interacts with the Wireless Network 220 to extract vehicular movement information from operational data on wireless communication devices. In step 241, the DEX Module 240 polls the Wireless Network 220 at preset time intervals to identify flat files and FTP files containing operational data, including location movement data, created by the Wireless Network 220 since the last polling. Independent of, and parallel to, this polling step, step 242 continuously receives operations data files that include location movement data from Wireless Network 220. In step 243, the DEX Module requests mobile station location data from the MPS on the Wireless Network 220 in response from a request from the DAN Module 260. At step 244, the data files received from the Wireless Network 220 are sent to parsers configured to receive each specific data file type. The parsers extract data for the Privacy and Movement Filtering and Detection modules. In step 245, the parsed data records are sent to the Privacy module.

In step 247 of the exemplary embodiment, the Privacy module acts on the parsed data, removing any personal identifying information about the mobile station associated with the data record. The process assigns a unique serial number, or otherwise referred to as a unique identifier number, to the record, replacing the mobile station identifier number. Additionally, if the record is associated with a phone call and the number dialed is included in the parsed data record, the call is categorized. Categories may include emergency calls (911), traveler information calls (511), operator assistance calls (411), or other calls. In step 248, the cleansed data records are sent to the Movement Filtering and Detection module.

In step 249, the Movement Filtering and Detection module creates a movement record associated with each unique serial number contained in the data records. These movement records are then stored in a Movement Record Hashtable and serve as the output of the DEX Module 240.

In step 246, the Configuration and Monitoring module constantly monitors operations of the other DEX Module components. If operations are outside a preset range of expected operations, then an e-mail or other type of alert is sent to a system administrator. Also, reports on configuration and operation status can be sent to the system administrator. This administrator can also access the DEX Module 240 and modify the configuration parameters.

In this exemplary embodiment, the DAN Module 260 analyzes movement records from the DEX Module 240 to estimate traffic velocities along predetermined travel routes. In step 261, the DAN Module 260 receives cell sector coverage maps from the Wireless Network 220 and roadway maps from the transportation department or commercial vendor. These maps are received periodically, whenever they have been updated. In step 262, these maps are used by the DAN Configuration Module, or otherwise referred to as the analysis configuration module, to generate cell sector/roadway overlay maps. The overlay maps identify which road segments are contained in which cell sectors. From these maps, all possible traffic routes between cell sectors are identified and stored in a Route Database and the route velocities and standard deviations are initialized.

In step 263, the Traffic Modeler receives the cell sector/roadway overlay maps from the DAN Configuration Module and movement records from the DEX Module 240. In step 264, the Traffic Modeler determines the traffic route traveled by individual mobile stations associated with the movement record and the velocity of the mobile station along that route. The Route Database is updated with the new route velocity information.

In step 265 (for Wireless Networks 220 with MPS capabilities), the MPS Determination module monitors the Traffic Modeler. The MPS Determination module evaluates the statistical quality of the data used by the Traffic Modeler. If the Traffic Modeler velocity estimates are based on a number of data records less than a threshold value needed to meet statistical quality requirements, then the MPS Determination module requests mobile station location data from the MPS on the Wireless Network 220 through the DEX Module 240. These data are then processed as any other data in the DEX Module 240.

FIG. 3 presents alternative embodiments of the relationship between the Data Extraction Module 240 and Data Analysis Node 260. In one embodiment 300, shown in FIG. 3*a*, a single Data Extraction Module 240*a* may be paired with a single Data Analysis Node 260*a*. As shown in an embodiment 310 in FIG. 3*b*, multiple Data Extraction Modules 240*a*, *b*, and *c* can exchange information with a single Data Analysis Node 260*a*. For example, Data Extraction Modules located at different wireless network operators in a metropolitan area can exchange information with a single Data Analysis Node that processes the traffic information for the entire metropolitan area. FIG. 3*c* depicts the alternative embodiment 320 in which a single Data Extraction Module 240*a* exchange information with multiple Data Analysis Nodes 260*a, b*, and *c*. For example, a Data Extraction Module at a wireless service provider can exchange information with Data Analysis Nodes located at unique end users. FIG. 3*d* depicts the alternative embodiment 330 in which multiple Data Extraction Modules 240*a, b*, and *c* exchange information with multiple Data Analysis Nodes 260*a, b*, and *c*. For example, Data Extraction Modules at multiple wireless service providers can exchange information with Data Analysis Nodes located at unique end users.

FIG. 4 presents a process-level block diagram of an exemplary DEX Module 240. A Data Input and Processing module 442 exchanges information with the Wireless Network 220. Data received from the Wireless Network 220 is sent through a Privacy module 444, where personal identifying data about the network subscriber are removed. Data Input and Processing module 442 and Privacy module 444 comprise the Processor Module 441. The cleansed data are then sent to a Movement Filtering and Detection module 446. The In the exemplary embodiment of the present invention, this module converts the cleansed wireless network data to movement records associated with a mobile station. The movement records are sent to the Data Analysis Node 260 through a HTTP Query Interface 450. The HTTP Query Interface 450 also sends information queries through the Data Input and Processing module 442 to the Wireless Network 220. A Configuration and Monitoring component 448 provides the means to monitor the performance of the Traffic Information System and set system operating parameters.

FIG. 5 highlights a Data Input and Processing module 442 of the exemplary embodiment of the present invention. A Data Input and Processing module 442 exchanges data with a Wireless Network 220. A Data Input and Processing module 442 includes file interfaces. These interfaces may be specific for a certain file type. In the exemplary embodiment depicted in FIG. 5, a Data Input and Processing module 442 includes a Flat File Interface 542 and an FTP File Interface 544. These interfaces can poll a Wireless Network 220, each polling the network component that contains the specific file type, data files on a local storage drive (flat files) and files at an FTP server (FTP files) in this exemplary embodiment.

Additionally, a Wireless Network 220 may send a continuous stream of data to an Other Continuous File Interface 546, i.e., a Data Input and Processing module 442 does not need to poll this data source. These data are taken from a BSC 522, MSC and VLR 524, and HLR 526 and may include call detail records, handover messages, and registration messages. One skilled in the art will appreciate that a Data Input and Processing module 442 can be configured to collect information in whatever form a Wireless Network 220 generates.

In the exemplary embodiment, a Data Input and Processing module 442 is also capable of receiving positioning data from Wireless Network 220 that include a mobile positioning system. An MPS Interface 548 interacts directly with an MPS Gateway 528 to request specific mobile station location data, based on a request from a Data Analysis Node 260 delivered through an HTTP Query Interface 450. The MPS Interface 548 delivers the mobile station location data directly to the Parsing Engine 550. Details on this request are provided later in this description, in connection with FIG. 18. Also discussed with respect to FIGS. 11-14 is the use of cell sector coverage maps 530 by the Data Analysis Nodes 260.

The file interfaces in a Data Input and Processing module 442 send the data to a working directory. Files in the working directory cause events to be generated and sent to a Parsing Engine 550 for processing. The message contains the file name of the data file to be parsed. From this name, the most appropriate parser syntax is selected and the file is parsed. The program directory for the exemplary embodiment of the present invention contains a parser's subdirectory. Jar files containing parsers are placed in this directory. The name of the jar file must match a class name in the jar file and that class must implement the parser interface. Once implemented, the parser converts the extracted data into a format that can be used by the Privacy module 442 and Movement Filtering and Detection module 446. When the processing of the file is complete, the file is moved to a processed directory. Upon startup of the Data Input and Processing module 442, all the files in the processed directory are purged if they are older than a specified number of days.

FIG. 6 presents details on the polling and parsing process 241 under an exemplary embodiment of the Data Input and Processing module. In step 615 of the process, Wireless Network Data 610, or otherwise referred to as operational data, flows continuously from the network to a designated data storage location on the Traffic Information System 100 for other data formats 636. These data files are parsed, at step 640, based on the specific file type. Parallel to step 615, step 620 periodically polls the Wireless Network's FTP server and local flat file storage drives for operational data. If new data files are found in decision step 625, the files are sorted in step 627. For example, BTS activity data is send to file storage location 632 for that data type, CDRs are sent to storage location 634 and A Interface and $A_{bis}$ Interface data are sent to storage location 636. One skilled in the art would appreciate that the present invention can accommodate a wide variety of file data types in this step, as evidenced by other data types 638. If no new files are found at step 625, the process returns to step 620 and polls the Wireless Network Data 610 at the next preset time interval.

Data files are then sent from the storage locations 632, 634, and 636 to the parser in step 640. In this step, the algorithm is specific to the data type parsed. For example, a unique algorithm would be used for CDRs as compared to BTS activity data. The parsed data is then sent to a Mobile Station Data Record file 645. Each data record in this file is read in step 650 and the data needed to support a Traffic Information System 100, the traffic data record, otherwise referred to as raw data record, is extracted in step 655 and sent to the Privacy module in step 670. This traffic data record contains wireless telephony communications network operational data used for assessing vehicular traffic movement. In the exemplary embodiment of the present invention, this traffic data record may include the start and end times for a call, the cell ID or specific locations for the start and end of the call, the mobile station identifier number, the number dialed, the call category, and the number of handoffs and the cell IDs and times for the handoffs. One skilled in the art would appreciate other data can be included in the raw data record.

FIG. 7 presents how data is processed 247 in the Privacy module for an exemplary embodiment of the present invention. Traffic data records associated with a mobile station are received from the Data Input and Processing module in step 710. In step 720, the hashtable 730 is searched for the mobile station identifier number contained in the data record. Hashtable 730 contains mobile station identifier numbers matched to a unique serial number assigned to that identifier by the Privacy module. In decision step 740, if the mobile station identifier number is not in the hashtable 730, then a unique serial number is assigned to that mobile station identifier number and the serial number/identifier pair is stored in the hashtable 730 at step 742. In an exemplary embodiment, the serial number is generated with the following algorithm in Table I. One skilled in the art would appreciate that a variety of techniques could be used to generate a unique alphanumeric indicator to represent the mobile station ID.

TABLE I $$S = ((d * 1000) + \text{mod}(r, 100)) * (\log_{10}(n) * 10) + n$$

Where:
S = unique serial number
d = day of year (1-365)
r = number of restarts counter
mod = modulo function
n = number of entries in the serial number hashtable In step 744, the serial number associated with that identifier number is retrieved from the hashtable 730. These steps cleanse the record of personal identifying information. In this embodiment, the Traffic Information System 100 does not associate movement records with a specific mobile station identifier number. In an alternative embodiment of the present invention, however, this cleansing step could be omitted. One possible application for this alternative embodiment is to enable the system to track a given mobile station as it moves, for example a parent tracking the location of a child with a cellular phone.

In decision step 750, a determination is made whether the phone number dialed is part of the raw data record. If so, then step 760 categorizes the call based on the characteristics of the dialed number and the process moves to step 770. Table II below summarizes the categorization for the exemplary embodiment.

TABLE II

| Cellular Phone Call Categories | |
|---|---|
| Dialed Number | Category |
| 911 | EMERGENCY_911 |
| 511, *X[1] | TRAVELER_INFO |
| 411, 0X | OPERATOR_ASST |
| Others | DIALED_CALL |

[1]"X" is any string of dialed numbers

If the phone number is not part of the traffic data record, the process moves directly from decision step 750 to step 770. In step 770, the Privacy module 444 creates a Location Record. This record is passed to the Movement Filtering and Detection module 446 in step 780. In the exemplary embodiment of the present invention, this location record may include the start and end times for a call, the cell ID or specific locations for the start and end of the call, serial number, the number dialed, the call category, registration information, whether the call was handed off or handed over, and the number of handoffs and the cell IDs and times for the handoffs. One skilled in the art would appreciate other data can be included in the Location Record.

FIG. 8 depicts the Movement Filtering and Detection process 249. As shown in FIG. 8, in step 810, the Movement Filtering and Detection module 446 receives location records from the Privacy module 444. At step 820, each location record is loaded. For each record, step 840 interrogates the Location Hashtable 830 and retrieves the last know location for the serial number associated with the record. In decision step 850, the location indicated on the location record is compared to the last know location for that serial number as recorded in the Location Hashtable 830. If the location differs, a Movement Record is generated and stored in cache in step 860. Then, in step 870, the Location Hashtable is updated and the movement record is recorded in the Movement Record Hashtable 880. If the last known position is not different from the current position at step 850, step 860 is skipped and the process moves to step 870. This process is repeated for all location records.

FIG. 9 outlines processing 246 performed by a Configuration and Monitoring module 448 in a DEX Module 240. A Configuration and Monitoring module 448 interacts with each other module in a DEX Module 240 to assess system operations. A Configuration and Monitoring module 448 of an exemplary embodiment functions to alert a system administrator if the DEX Module 240 is functioning outside a preset operational range 916 and to allow a system administrator to set configuration parameters 916. In the exemplary embodiment, a System Administrator can configure the Traffic Information System 100 over an intranet or a virtual private network (VPN) by conducting configuration activity 916 using a secure connection, e.g., passwords or Secure Sockets Layer (SSL) certificates. This configuration activity 916 may include the following tasks, as shown in Table III.

TABLE III

| |
|---|
| setting the frequency of polling the Wireless Network 220; |
| setting the maximum time a mobile station can sit in one place before its serial number is released; |
| setting the maximum amount of time that individual cached record can reside on the DEX before it is discarded; |
| setting the minimum time between position requests. This is used to pace requests to the mobile positioning system of the Wireless Network 220; |
| setting the minimum time between position requests for the same MS. This setting is used to pace requests to the mobile positioning center; |
| setting the locations authorized to be delivered to the DAN 260 for each event notification (e.g., nothing, area, cell, edge, or position); |
| authorizing the details of a dialed number to be delivered to the DAN 260 for each event notification (e.g., nothing, a classification, the three-digit NPA, the six-digit office code, or the entire called number); |
| authorizing the details of a number for incoming calls to be delivered to the DAN 260 for each event notification (e.g., nothing, a classification, the three-digit NPA, the six-digit office code, or the entire called number); and |
| Identification of the mobile stations that have given permission to release CPNI information for the application in this DAN 260. |

Additionally, the Performance Statistics Cache 914 can store statistics on system performance as defined by the system administrator. This statistics cache can result in alert and reporting activity 918 to report monitored system behavior, either containing routine information or alerting the administrator that the system is performing outside specifications. This alert and reporting activity 918 can be transmitted by way of e-mail, pagers, telephone, instant messages, or other similar alert or reporting actions. In the exemplary embodiment, the cached statistics may include the following information, as shown in Table IV.

TABLE IV

| |
|---|
| number of CDRs processed; |
| number of A-interface messages processed, i.e., BTS interface data; |
| number of cell-based position requests solicited; |
| number of cell-based position requests cancelled; |
| number of mobile station identifier-base position requests solicited; |
| number of mobile station identifier-based position requests cancelled; |
| number of solicited position requests launched; |
| number of solicited position request responses received; |
| number of unsolicited position request responses received; |
| number of event notifications generated for each DAN 260; |
| number of event notifications delivered to each DAN 260; and |
| number of bytes delivered to each DAN 260. |

FIG. 10 presents the process-level block diagram for the Data Analysis Node 260 in an exemplary embodiment. A DAN Module 260 comprises a DAN Configuration Module 1050, a DAN Traffic Modeler 1060, and DAN MPS Determination module 1070. A DAN Configuration Module 1050 receives data in the form of cell sector coverage maps 530, from the Wireless Network 220 provider, and roadway maps 1040, from the transportation department or a commercial vendor. These maps are used to define routes used by the Traffic Modeler 1060 to translate the cell sector ID to a physical location. How the maps are used is detailed further below, in association with FIGS. 11-14. These data are updated whenever the data source changes. For example, if the Wireless Network 220 changes their infrastructure resulting in a new cell sector coverage map 1030, the new data is provided to the DAN Configuration Module 1050.

In an exemplary embodiment, a DAN Traffic Modeler 1060 accepts movement records from a Movement Record Hashtable 880 in a DEX Module 240. A DAN Traffic Modeler's 1060 function is to output traffic information in the form of travel velocity estimates along designated routes. This information is stored in a Route Database 1080. A DAN Traffic Modeler 1060 develops these estimates by determining the route taken by a mobile station based on the movement records and the routes generated in a DAN Configuration Module 1050. A DAN Traffic Modeler 1060 then chooses one route out of potential routes and uses timing data associated with the movement record to estimate the velocity along the chosen route. Potential routes are identified from the Route Database 1080 and modified, or trimmed, if necessary. Route identification and trimming are discussed in association with FIGS. 15 and 16, respectively.

A DAN Module 260 also augments the movement records 880 it receives from a DEX Module 240 with mobile station location data from an MPS on a Wireless Network 220. A MPS Determination module 1070 functions to routinely evaluates the quantity and quality of the velocity estimates from the Traffic Modeler 1060 and, if needed, sends a request for specific mobile station location data through the DEX Module 240. The MPS Determination module 1070 is used with wireless telephony communications networks that support MPS.

FIG. 11 shows the route generation process 262*a* in a DAN Configuration Module 1050 for an exemplary embodiment. The cell sector coverage maps are stored, by cell sector, in a database 530. In step 1110, a cell sector is selected from the database 530. In step 1140, the geographic information system database containing roadway maps 1040 is queried to determine all road segments that intersect the cell sector. The results from this query are boundary road segments 1150 associated with the cell sector, i.e., road segments that cross the boundary of a cell sector, connecting a cell sector to an adjacent cell sector. The boundary road segments 1150 serve as the input for route processing 1160, discussed below in association with FIG. 12. The results from route processing return at step 1170. The overall process is repeated for each cell sector in the database at step 1180. As discussed in more detail below, this process generates a database of potential routes used by the Traffic Modeler 1060. The route generation process 262 is run by a DAN Configuration Module 1050 whenever the cell sector coverage maps or the roadway maps are updated.

FIG. 12 details the routing process 262*b* by a DAN Configuration Module 1050 for the exemplary embodiment. In step 1210, the routes comprising the boundary segments are stored in the Route Database 1240. For example, a boundary segment that connects Cell Sector A with Cell Sector B is a route from Cell Sector A to Cell Sector B. These routes serve as the initial building blocks for the routes in the Route Database 1240. In step 1215, the intra-sector route between two boundary segments is determined. This route is the shortest path, in terms of distance, from one boundary segment to another boundary segment over existing roadways. This path is determined from a GIS database of roadways. This database will define road segments between the boundary segments. The GIS database may use one of a variety of ways to define the road segments. For example, a segment can be a stretch of road from one intersection to another or a change in road name. The present invention can use the GIS data in whatever form the database has been established.

The shortest path between boundary segments defines an inter-sector route, a route from one sector through an adjacent sector, to a third sector. FIGS. 13*a* and *b* depict an illustrative example of cell sectors and roadways. For illustrative purposes, the cell sectors have been defined as squares of uniform size and alignment. FIG. 13*a* shows sixteen cell sectors, labeled "A" to "P." The dark lines indicate roadways. FIG. 13*b* shows an enlarged image of cell sector C and the adjacent sectors. In this example, an inter-section route would be from cell sector A to cell sector D over the roadway from point 1310 to point 1330 to point 1320. Another inter-sector route would be from cell sector A to cell sector F over the roadway from point 1310 to point 1320 to point 1340. A third inter-sector route would be from cell sector D to cell sector F over the roadway from point 1330 to point 1320 to point 1340.

FIG. 13 depicts a simplified representation of a cell sector/roadway overlay. FIG. 14 presents a more realistic depiction. The shaded polygons represent unique cell sectors. As can be seen in FIG. 14, the cell sectors vary in size and the roadways within a sector can be complex.

Returning to FIG. 12, step 1220 initiates a loop for each defined inter-segment traffic route developed in step 1215. In step 1225, the segment velocity is initialized to the posted speed limit for the segment plus or minus a variance of twenty-five percent of that posted speed limit. This initialization step is performed for each of the 168 hours in a week. In an alternative embodiment, the time increments can be set to every 15 minutes, for a total of 672 increments. One skilled in the art would appreciate that the number of time increments can be based on any time division, e.g., per hour, per half-hour, per fifteen minutes, or per minute. The calculation for a per hour time division is as follows:

$$v_{s,I}=Vp_s$$

$$var_{s,I}=0.5*Vp_s$$

Where:

I=the hour of the week, from 1 to 168, with the hour between 12:00 am and 1:00 am Sunday being 1 s=road segment s $v_{x,I}$=average velocity at hour I $Vp_s$=posted speed limit for segment s $var_{s,I}$=variance range of velocity at hour I for segment s, which represents the range from −25% to +25%

As stated above, the GIS database defines what comprises a segment. In the illustrative example in FIG. 13, a segment may be the length of roadway from point 1310 to 1320 and another segment the length of roadway from 1320 to 1340. The entire route from A to F would be the length of roadway defined by those two segments. In step 1230, the route velocity is initialized to the weighted average velocity for the traffic route, weighted by the normalized length of each segment. The calculation is as follows:

$$v_{r,I}=\frac{\sum\left(v_{s,I}*\frac{d_s}{d_r}\right)}{d_r}$$

Where:

$v_{r,I}$=average velocity for route r for hour I s=road segment s where the route r is defined by the connection of each segment $v_{s,I}$=average velocity at hour I $d_s$=distance of road segment $d_r$=distance of route=$\Sigma d_s$ In step 1233, the process initializes the variance of the traffic route velocity to plus or minus twenty-five percent of the weighted average velocity calculated at step 1230. The calculation is as follows.

$$var_{r,I}=v_{r,I}*0.5$$

Where:

$var_{r,I}$=variance of velocity for route r for hour I $v_{r,I}$=average velocity for route r for hour I The traffic routes and initialized velocities for those routes for each of the 168 hours in a week, the time increment in this exemplary embodiment, are stored at step 1235 in the Route Database 1080. At step 1240, the number of handoffs for each route is calculated. The number of handoffs is the number of times a route crosses over a cell sector boundary. For example, in FIG. 13, the route from cell sector A to cell sector E would have three handoffs, one when the mobile station moves from sector A to C, one when it moves from C to F, and one when it moves from F to E. In step 1245, the sector where the route terminates, the "to sector," and the sector where the route originates, the "from sector," together with the route ID and number of handoffs, are stored in the Route Database 1080. The process is repeated for each inter-sector route associated with the boundary segment. The process then returns to the Route Generation process in step 1255. This process is discussed above. The entire Route Generation process is repeated at step 1250, and builds on prior routes, until the Route Database 1080 contains all possible routes from each cell sector to each cell sector.

FIG. 15 presents the Route Selection process 264*a* for an exemplary embodiment of the present invention. This process 264*a* defines the traffic route for a mobile station and is performed by the Traffic Modeler 1060. In step 1505, movement vectors are retrieved from the DEX for a given serial number. In the exemplary embodiment of the present invention, these vectors are retrieved periodically at specified time intervals, time intervals based on the configuration of the DEX.

In Step 1510, a polyline of the movement locations associated with the mobile station is generated. Referring to the illustrative example in FIG. 13, assume that a mobile station places a call at time $t_1$ while in cell sector D. The call terminates at time $t_2$ while the mobile station is in sector G. The same mobile station a short time later, time $t_3$, places a call from sector M and the call terminates at time $t_4$ in sector O. The DEX would have developed three movement vectors, one from sector D at $t_1$ to sector G at $t_2$, one from sector G at $t_2$ to sector M at $t_3$, and one from sector M at $t_3$ to sector O at $t_4$. The polyline associated with this movement would be from D to G to M to O.

In step 1515, the polyline is broken into start and end sector pairs. In the example presented in the previous paragraph, the start and end sector pairs would be DG, DM, DO, GM, GO, and MO. In other words, the start and finish pairs comprise the combination of all points that comprise the polyline. For each of these start and end sector pairs, step 1520 of the process queries the database for all traffic routes between that start and end sector pair. This query returns all information about the route stored in the Route Database 1525. In the exemplary embodiment of the present invention, this information includes the route ID, the average velocity and variance of the velocity over that route for each of the 168 hours in a week, the beginning and ending sectors associated with that route, and the expected number of handoffs associated with the route.

The exemplary process analyzes each of the possible routes, as shown by the loop initiated in step 1530. In step 1535, the handoff score is calculated. The handoff score is an exemplary technique that evaluates how likely it is that the mobile station traveled the route being analyzed. The score is calculated as follows:

$$\text{Handoff Score} = \frac{B_H + (\omega \times H)}{1 + \Delta_h} \times \frac{1}{1 + n_R}$$

Where:

H=the number of handoffs for the given polyline $\Delta_h$=absolute difference between observed handoffs and expected handoffs $n_R$=number of routes where $\Delta_h$=0

$B_H$=base handoff score (default is 0.9)

ω=handoff weight (default is 0.01)

In step 1540, the handoff score is compared to a cutoff value. If yes, the route is saved at step 1545. If not, the route is discarded at step 1550. For saved routes, the velocity over that route is calculated in step 1555 and is based on the length of the route and the beginning and ending timestamps associated with the movement vector as supplied by the Data Extraction Module. The velocity is:

$$v_r = \frac{d_r}{t_2 - t_1}$$

Where:

$v_r$=velocity of route $d_r$=distance of route $t_2$=time of $\text{timestamp}_2$, the end of the movement $t_1$=time of $\text{timestamp}_1$, the start of the movement In steps 1560 and 1563, this velocity is compared to the maximum and minimum cutoffs for the velocity for that route. These cutoff values are based on velocities and variances contained in the Route Database 1080 and a preset tolerance level, in terms of the number of standard deviations used to calculate the maximum and minimum cutoff values. For example, a system with a wide tolerance may set the number of standard deviations in the acceptable range to three or four, while a system with a narrow tolerance may set the number of standard deviations to one or two. The maximum and minimum cutoff values are calculated as follows:

$$v_{max} \leqq v_{r,t_1} + (C_v * \sqrt{var_{r,t_1}})$$

Where:

$v_{max}$=maximum cutoff velocity $v_{r,t_1}$=velocity of route at hour $t_1$ $C_v$=cutoff for velocity comparison in number of standard deviations $var_{r,t_1}$=variance of velocity for route r at hour $t_1$ $t_1$=time of $\text{timestamp}_1$, the start of the movement $$v_{min} \leqq v_{r,t_1} - (C_v * \sqrt{var_{r,t_1}})$$

Where:

$v_{min}$=minimum cutoff velocity $v_{r,t_1}$=velocity of route at hour $t_1$ $C_v$=cutoff for velocity comparison in number of standard deviations $var_{r,t_1}$=variance of velocity for route r at hour $t_1$ $t_1$=time of $\text{timestamp}_1$, the start of the movement Routes with velocities that are less than the maximum cutoff velocity and greater than the minimum cutoff velocity are saved at step 1570. Routes with velocities that exceed the maximum cutoff move to decisional step 1565 to determine if the route can be trimmed. A route can be trimmed if it is comprised of multiple segments. If the route can be trimmed, the process moves to step 1575. If not, the route is discarded at step 1550. The results from the route trimming process return to the route selection process 264 at step 1580. For routes that are saved at step 1570, the process moves to decision step 1585. If another route must be evaluated, the process returns to step 1530. If not, the process moves to velocity estimation at step 1590.

FIG. 16 presents the process for route trimming 264*b* for an exemplary embodiment of the present invention. This process 264*b* is a loop that compares the calculated route velocity with the maximum cutoff velocity for that route. The process then removes segments from the route and compares the new velocity with the cutoff velocity. In the initial calculation of velocity, the Traffic Modeler 1060 assumes that the mobile station is at the farthest end of a cell sector in relation to the end sector location and similarly that the mobile station ends at the farthest part of the ending sector in relation to the starting sector. These assumptions make the route distance the longest it possibly can be. By removing a segment at either end of the route, the route becomes shorter and the velocity calculated by the Traffic Modeler 1060 decreases (a shorter route traveled over a fixed time period yields a lower average route velocity). In the process step 1610, the first loop (counter equal to 0, set at step 1605) is the velocity value calculated in the route selection process (see FIG. 15).

Decision step 1615 looks to determine if the route velocity is less than the maximum velocity for the route. For route velocities that are less then the maximum velocity, the process returns to the route selection process at step 1620. For route velocities that are equal to or greater than the maximum velocity cutoff at step 1615, the process looks at the loop counter at step 1630. If the loop counter is even, the process looks at the beginning sector in the route. At step 1625, the process determines if there are more than two segments comprising the route in the beginning cell sector. If so, the process removes the first segment from the route, at step 1645. The process increments the loop counter at step 1660. If there are not more than two segments at the beginning of the route, the process moves to decision step 1640. If the answer to step 1640, is loop counter odd, is yes, then the process moves to step 1650 and returns an invalid route. This step exists because the process just came from the "loop counter is even" branch, so a yes result means that the process is flawed. If the result in step 1640 is no, the process moves to step 1635.

Step 1635 determines if there are more than two segments comprising the route in the ending cell sector. If so, then the process removes the last segment at step 1655, increments the loop counter at step 1660 and is returned to the beginning of the process at step 1670. The process returns to the Route Selection process when there are not more than two road segments at either the beginning sector ending sector of the route or when sufficient segments are removed so that the velocity is below the cutoff.

The Traffic Modeler 1060 estimates a velocity, based on the possible routes the mobile station followed, as indicated in FIG. 17. In step 1710, the velocity estimation process 264*c* is triggered by the route selection process 264*b*. In step 1720 the best route is selected from all the possible routes that survived the Route Selection process (see FIG. 15). In the exemplary embodiment of the present invention, the "best" route is based on a statistical analysis of the velocities and handoff scores for each possible route. The statistical analysis results in a z score for each possible route. One skilled in the art would appreciate that a variety of statistical analyses could be performed to select the "best" route. The best route is the route with the minimum of the following expression:

$$\mathrm{Min}((\omega_z * z^{hour(t_1)}{}_v)+(\omega_h * h))$$

Where:

$\omega_z$=weight of z-score default is 0.3

$\omega_h$=weight of handoff score default is 0.7 z=z-score of velocity at time $t_1$ h=handoff score $t_1$=timestamp$_1$, the start of the movement For the best route, the process then calculates the route velocity at step 1730. The velocity is calculated as follows:

$$v_{r,I} = \frac{\sum\left(v_{s,I} * \frac{d_s}{d_r}\right)}{d_r}$$

Where:

$v_{r,I}$=average velocity for route r for hour I s=road segment s where the route r is defined by the connection of each segment $v_{s,I}$=average velocity at hour I $d_s$=distance of road segment $d_r$=distance of route=$\Sigma d_s$ At step 1740, the process calculates the route velocity based on the overall route distance and time. In other words, the route velocity is the ratio of the total length of the route to the time it took the mobile station to move from the initial location to the ending location. Step 1745 begins a loop for all route segments. At step 1750, the difference of these two velocity estimates is calculated. This difference, $v_{diff}$, is used in step 1760 to calculate a new segment velocity, as follows:

$$v_s^0 = v_s^{hour(t_1)} + v_{diff} * \left(\frac{\mathrm{var}_s^{hour(t_1)}}{\sum \mathrm{var}_{seg}^{t_1}}\right)$$

Where:

$v_s{}^0$=the current velocity on road segment s $v_s{}^{hour(t_1)}$=average velocity for segment s for time stamp$_1$ $v_{diff}$=the difference of the observed velocity and the calculated $\mathrm{var}_s$=variance of the velocity for road segment s at hour $t_1$ $\Sigma \mathrm{var}_{seg}{}^{t_1}$=sum of the variances for each of the segments in route r The difference in the two velocity estimates is a measure of the variance in the velocity and the calculation above establishes a new variance (as compared to the initialized variance from step 1225, FIG. 12) based on the calculated difference.

In step 1780 the average velocity by segment and variance is updated in the database. These values are determined by the following equations:

$$n_s{}^{hour(t_1)}=n_s{}^{hour(t_1)}+1$$

$$v_s^{hour(t_1)} = \left(v_s^{hour(t_1)} * \frac{n_s^{hour(t_1)} - 1}{n_s^{hour(t_1)}}\right) + \left(v_s^0 * \frac{1}{n_s^{hour(t_1)}}\right)$$

$$\mathrm{var}_s^{hour(t_1)'} = \frac{\left(\mathrm{var}_s^{hour(t_1)} * \left(n_s^{hour(t_1)} - 2\right)\right) + \left(v_s^0 - v_s^{hour(t_1)'}\right)^2}{n_s^{hour(t_1)} - 1}$$

Where:

$n_s{}^{hour(t_1)}$=number of samples for the segment s at hour $t_1$ $v_s{}^{hour(t_1)}$=average velocity for segment s for timestamp$_1$ $\mathrm{var}_s{}^{hour(t_1)}$=variance of velocity at hour $t_1$ for segment s At step 1790, the process updates the average velocity and variance for the entire route. These updates are based on the following calculation:

$$n_r{}^{hour(t_1)}=n_r{}^{hour(t_1)}+1$$

$$v_r^{hour(t_1)} = \frac{\sum\left(v_s^{hour(t_1)} * \frac{d_s}{d_r}\right)}{d_r}$$

$$\mathrm{var}_r^{hour(t_1)} = \frac{\left(\mathrm{var}_r^{hour(t_1)} * \left(n_r^{hour(t_1)} - 2\right)\right) + \left(v_r^0 - v_r^{hour(t_1)'}\right)^2}{n_r^{hour(t_1)} - 1}$$

Where:

s=road segment s where r is defined by the connection of all segments $d_s$=distance of road segment $d_r$=distance of route=$\Sigma d_s$ $n_r^{hour(t_1)}$=number of samples for the route r at hour $t_1$ $v_s^{hour(t_1)}$=average velocity for segment s for timestamp$_1$ $\mathrm{var}_s^{hour(t_1)}$=variance of velocity at hour $t_1$ for segment s In the exemplary embodiment of the present invention, a separate module, the MPS Determination module 1070 of the DAN Module 260, operates to assess the quality of the velocity estimates from the Traffic Modeler 1060, based on the number of samples used to generate the velocity estimates. Step 1795 from the velocity estimation process 264*c* serves as a gateway for the MPS Determination module 1070 polling the Traffic Modeler 1060. FIG. 18 presents the operation of the MPS Determination module 1070. In step 1805, the process polls the Traffic Modeler, extracting the updated segment velocity and variance data from the velocity estimation process 264*c* (see FIG. 17 at 1795). Step 1810 initiates a loop for each road segment analyzed in the velocity estimation process 264*c*, the MPS Determination module 1070 determines, at step 1815, the number of samples needed for the desired level of precision and determines, at 1820, if that level is met. The required number of samples for a given precision level is calculated as follows:

$$n = \frac{z_{\alpha/2}^2 \mathrm{var}_s^{hour(t_1)}}{E^2}$$

Where $z_{\alpha/2}$=is the z-score of the confidence interval desired (e.g. 90% or z=1.645)

$\mathrm{var}_s^{hour(t_1)}$=variance of the velocity of the road segment

E=is half the width of the range (e.g. +/−10 MPH)

If the number of samples used in the Traffic model is equal to or greater than the target number calculated at step 1815, then the segment is not considered further, at step 1825. If not, the segment is added to the MPS request list at step 1835 and the loop is repeated at step 1840 for each segment. Once all the segments have been evaluated, the process, at step 1845, retrieves from the Route Database 1830 all routes that contain the segments in the MPS request list from 1835. At step 1850, the process issues a request to the DEX for mobile station location data for mobile stations on traffic routes containing the listed segments. This limited use of MPS data minimizes the load on the Wireless Networks' resources, revealing a desired element of the exemplary embodiment of the present invention.

In summary, the present invention relates to a Traffic Information System 100. An exemplary embodiment of the system comprises two main components, a DEX Module 240 and a DAN Module 260. In this embodiment, a DEX Module 240 extracts data related to communication activity of mobile stations from an existing Wireless Network 220 with minimal impact on the operations of the Wireless Network 220. In an exemplary embodiment, a DEX Module 240 processes that data to remove personal identifying information about the mobile station. In this procession, the traffic data record may be categorized based on the type of phone call made. These traffic data records are further processed to generate movement records associated with individual mobile stations.

In an exemplary embodiment, a DAN Module 260 combines the movement records from the DEX Module 240 with data associated with the geographic layout of cell sectors and roadways to estimate travel velocities along specific travel routes. With the data associated with the geographic layout of cell sectors and roadways, a DAN Module 260 generates maps that overly the cell sector grid onto roadway maps. These overlay maps are used to generate all possible travel routes between any two cell sectors. The DAN Module 260 may also retrieve mobile station location data from an MPS on a Wireless Network 220 to improve the statistical quality of the velocity estimates.

What is claimed is:

1. A method for determining traffic velocities along a plurality of traffic routes by using operational data associated with mobile stations operating in a wireless telephony communications network overlapping the traffic routes and comprising a cell sector coverage area having a plurality of cell sectors, comprising the steps of:

generating a plurality of traffic data records based on the operational data from the wireless telephony communication network, each traffic data record identifying a location within the wireless telephony communication network for one of the mobile stations at a particular time;

generating a movement record in response to processing at least two of the traffic data records associated with a wireless communication activity by a same one of the mobile stations, each movement record comprising locations within the wireless telephony communication network for the same mobile station at different times and reflecting movement by the same mobile station;

creating a plurality of traffic routes between any two of the cell sectors by processing cell sector coverage area information for the wireless telephony communications network and geographic information for roadways within the cell sector coverage area of the wireless telephony communications network;

identifying from the plurality of traffic routes a particular one of the traffic routes traveled by a vehicle associated with one of the mobile stations by processing the movement records for the mobile station, comprising the steps of:

identifying a set of cell sectors from a polyline of locations associated with the movement records for the same mobile station;

for each set of cell sectors, determining all of the routes that traverse the cell sectors in the cell sector set;

calculating a cell handoff score for each route traversing the cell sector set;

eliminating any of the traffic routes that are not within an acceptable range of the handoff scores;

calculating a velocity along each traffic route that are not eliminated by the handoff score using time stamps in the movement record;

trimming each traffic route for which a velocity was calculated in the event that the calculated velocity exceeds a maximum velocity cutoff;

eliminating any traffic routes for which a velocity was calculated in the event that the calculated velocity exceeds the maximum velocity cutoff and the traffic route cannot be trimmed;

eliminating any traffic route for which a velocity was calculated in the event that the calculated velocity is less than a minimum velocity cutoff;

calculating a z-score of the calculated velocity for all of the remaining ones of the traffic routes that not been eliminated; and selecting the particular traffic route from the remaining traffic routes based on the z-score of the calculated velocity and the handoff score; and calculating an estimate of a velocity of vehicular traffic along the particular traffic route by using the movement records associated with the particular traffic route.

2. A computer-readable storage device storing a set of computer-executable instructions implementing a method for determining traffic velocities along a plurality of traffic routes by using operational data associated with mobile stations operating in a wireless telephony communications network overlapping the traffic routes and comprising a cell sector coverage area having a plurality of cell sectors, comprising the steps of:

generating a plurality of traffic data records based on the operational data from the wireless telephony communication network, each traffic data record identifying a location within the wireless telephony communication network for one of the mobile stations at a particular time; and generating a movement record in response to processing at least two of the traffic data records associated with a wireless communication activity by a same one of the mobile stations, each movement record comprising locations within the wireless telephony communication network for the same mobile station at different times and reflecting movement by the same mobile station;

creating a plurality of traffic routes between any two of the cell sectors by processing cell sector coverage area information for the wireless telephony communications network and geographic information for roadways within the cell sector coverage area of the wireless telephony communications network;

identifying from the plurality of traffic routes a particular one of the traffic routes traveled by a vehicle associated with one of the mobile stations by processing movement records for the mobile station, comprising the steps of:

identifying a set of cell sectors from a polyline of locations associated with the movement records for the same mobile station;

for each set of cell sectors, determining all of the routes that traverse the cell sectors in the cell sector set;

calculating a cell handoff score for each route traversing the cell sector set;

eliminating any of the traffic routes that are not within an acceptable range of the handoff scores;

calculating a velocity along each traffic route that are not eliminated by the handoff score using time stamps in the movement record;

trimming each traffic route for which a velocity was calculated in the event that the calculated velocity exceeds a maximum velocity cutoff;

eliminating any traffic routes for which a velocity was calculated in the event that the calculated velocity exceeds the maximum velocity cutoff and the traffic route cannot be trimmed;

eliminating any traffic route for which a velocity was calculated in the event that the calculated velocity is less than a minimum velocity cutoff;

calculating a z-score of the calculated velocity for all of the remaining ones of the traffic routes that not been eliminated; and selecting the particular traffic route from the remaining traffic routes based on the z-score of the calculated velocity and the handoff score; and calculating an estimate of a velocity of vehicular traffic along the particular traffic route for a specific time by using the movement records associated with the particular traffic route.

3. A method for determining traffic velocities along a plurality of traffic routes by using operational data associated with mobile stations operating in a wireless telephony communications network overlapping the traffic routes and comprising a cell sector coverage area having a plurality of cell sectors, comprising the steps of:

generating a plurality of traffic data records based on the operational data from the wireless telephony communication network, each traffic data record identifying a location within the wireless telephony communication network for one of the mobile stations at a particular time;

generating a movement record in response to processing at least two of the traffic data records associated with a wireless communication activity by a same one of the mobile stations, each movement record comprising locations within the wireless telephony communication network for the same mobile station at different times and reflecting movement by the same mobile station;

creating a plurality of traffic routes between any two of the cell sectors by processing cell sector coverage area information for the wireless telephony communications network and geographic information for roadways within the cell sector coverage area of the wireless telephony communications network;

identifying from the plurality of traffic routes a particular one of the traffic routes traveled by a vehicle associated with one of the mobile stations by processing the movement records for the mobile station;

calculating an estimate of a velocity of vehicular traffic along the particular traffic route by using the movement records associated with the particular traffic route;

determining whether the estimate of the velocity of vehicular traffic along the particular traffic route for a specific time is based on a number of movement records at or above a threshold;

for those traffic routes where the velocity estimate is based on a number of movement records below a threshold, requesting mobile station location data from the wireless telephony communication network associated with the particular traffic route at the specific time;

receiving the requested mobile station location data from the wireless telephony communication network; and revising the calculation of the estimate of the velocity of vehicular traffic along the particular traffic route for the specific time by using the received mobile station location data.

* * * * *